US012645953B2

(12) United States Patent
Braviner et al.

(10) Patent No.: US 12,645,953 B2
(45) Date of Patent: Jun. 2, 2026

(54) PREDICTING ACTIVITY-SPECIFIC ENGAGEMENT EVENTS USING TRAINED ARTIFICIAL-INTELLIGENCE PROCESSES

(71) Applicant: The Toronto-Dominion Bank, Toronto (CA)

(72) Inventors: Harry Joseph Braviner, Toronto (CA); Maksims Volkovs, Toronto (CA); Tomi Johan Poutanen, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 1079 days.

(21) Appl. No.: 17/715,230

(22) Filed: Apr. 7, 2022

(65) Prior Publication Data

US 2022/0327397 A1 Oct. 13, 2022

Related U.S. Application Data

(60) Provisional application No. 63/172,718, filed on Apr. 9, 2021.

(51) Int. Cl.
*G06N 5/022* (2023.01)

(52) U.S. Cl.
CPC .................................... *G06N 5/022* (2013.01)

(58) Field of Classification Search
None
See application file for complete search history.

(56) References Cited

U.S. PATENT DOCUMENTS

| | | | |
|---|---|---|---|
| 10,896,679 B1 * | 1/2021 | Hu | ........................... G06N 3/08 |
| 11,948,019 B1 * | 4/2024 | Singh | ...................... G06F 9/543 |
| 2019/0362219 A1 | 11/2019 | Scheffler | |
| 2020/0210768 A1 | 7/2020 | Turkelson et al. | |
| 2020/0401612 A1 * | 12/2020 | Dotan-Cohen | ....... G06F 16/335 |
| 2020/0411037 A1 * | 12/2020 | Newell | ................... G10L 25/51 |

OTHER PUBLICATIONS

An International Search Report and Written Opinion mailed by the Canadian Intellectual Property Office in International Application No. PCT/CA/2022/050544 (8 pages).

* cited by examiner

*Primary Examiner* — Vincent Gonzales
*Assistant Examiner* — Corey M Sackalosky
(74) *Attorney, Agent, or Firm* — Nixon Peabody LLP

(57) ABSTRACT

The disclosed embodiments include computer-implemented systems and processes that predict activity-specific engagement events using trained artificial-intelligence processes. For example, an apparatus may generate an input dataset based on elements of first interaction data associated with an activity and a first temporal interval. Based on an application of a trained artificial intelligence process to the input dataset, the apparatus may generate output data representative of a predicted likelihood of an occurrence of an engagement event associated with a cessation of the activity during a second temporal interval, which may be disposed subsequent to the first temporal interval and separated from the first temporal interval by a corresponding buffer interval. The apparatus may transmit at least a portion of the generated output data to a computing system, which may perform operations based on the portion of the output data.

19 Claims, 8 Drawing Sheets

Figure 3:
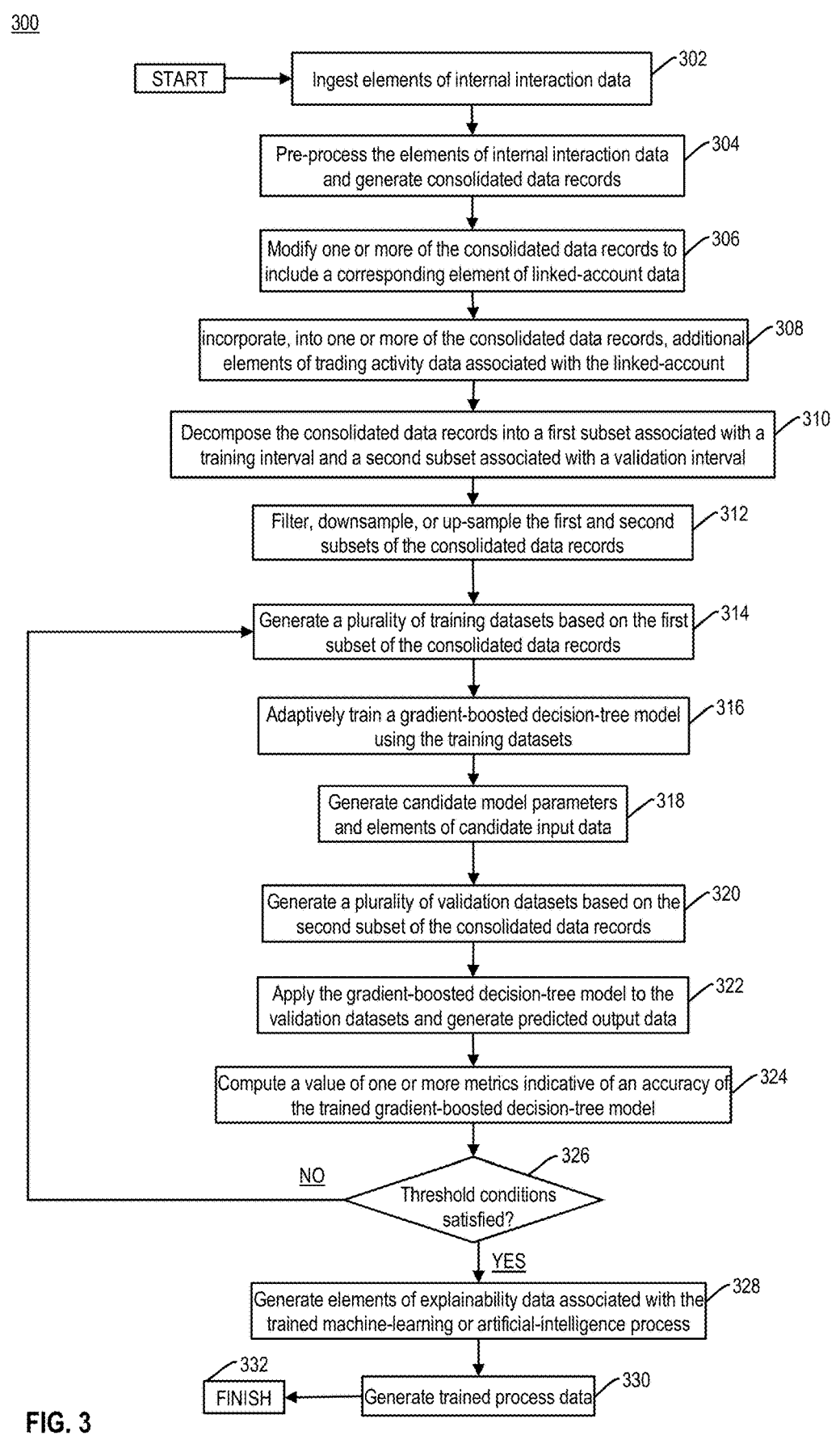

300

START → Ingest elements of internal interaction data ⟋302

↓

Pre-process the elements of internal interaction data and generate consolidated data records ⟋304

↓

Modify one or more of the consolidated data records to include a corresponding element of linked-account data ⟋306

↓

Incorporate, into one or more of the consolidated data records, additional elements of trading activity data associated with the linked-account ⟋308

↓

Decompose the consolidated data records into a first subset associated with a training interval and a second subset associated with a validation interval ⟋310

↓

Filter, downsample, or up-sample the first and second subsets of the consolidated data records ⟋312

↓

Generate a plurality of training datasets based on the first subset of the consolidated data records ⟋314

↓

Adaptively train a gradient-boosted decision-tree model using the training datasets ⟋316

↓

Generate candidate model parameters and elements of candidate input data ⟋318

↓

Generate a plurality of validation datasets based on the second subset of the consolidated data records ⟋320

↓

Apply the gradient-boosted decision-tree model to the validation datasets and generate predicted output data ⟋322

↓

Compute a value of one or more metrics indicative of an accuracy of the trained gradient-boosted decision-tree model ⟋324

↓

NO ← ◇ Threshold conditions satisfied? ⟋326

YES ↓

Generate elements of explainability data associated with the trained machine-learning or artificial-intelligence process ⟋328

↓

332⟍ FINISH ← Generate trained process data ⟋330

PREDICTING ACTIVITY-SPECIFIC ENGAGEMENT EVENTS USING TRAINED ARTIFICIAL-INTELLIGENCE PROCESSES

CROSS-REFERENCE TO RELATED APPLICATION

This application claims the benefit of priority under 35 U.S.C. § 119(e) to prior U.S. Provisional Application No. 63/172,718, filed Apr. 9, 2021, the disclosure of which is incorporated by reference herein to its entirety.

TECHNICAL FIELD

The disclosed embodiments generally relate to computer-implemented systems and processes that facilitate a prediction of activity-specific engagement events using trained artificial intelligence processes.

BACKGROUND

Today, many financial institutions offer a variety of financial products or services to their customers, both through in-person branch banking and through various digital channels. The financial products and services may include one or more investment products or accounts that fund, and receive proceeds from, one or more trades of securities listed on corresponding exchanges

SUMMARY

In some examples, an apparatus includes a memory storing instructions, a communications interface, and at least one processor coupled to the memory and the communications interface. The at least one processor is configured to execute the instructions to generate an input dataset based on elements of first interaction data associated with an activity. The first interaction data is associated with a first temporal interval. The at least one processor is further configured to, based on the application of a trained artificial intelligence process to the input dataset, generate output data representative of a predicted likelihood of an occurrence of an engagement event during a second temporal interval. The second temporal interval is subsequent to the first temporal interval and is separated from the first temporal interval by a corresponding buffer interval, and the engagement event is associated with a cessation of the activity. The at least one processor is further configured to transmit at least a portion of the generated output data to a computing system via a communications interface. The computing system is configured to perform operations based on the portion of the output data.

In other examples, a computer-implemented method includes generating, using at least one processor, an input dataset based on elements of first interaction data associated with an activity. The first interaction data is associated with a first temporal interval. The computer-implemented method also includes, based on the application of a trained artificial intelligence process to the input dataset, generating, using the at least one processor, output data representative of a predicted likelihood of an occurrence of an engagement event during a second temporal interval. The second temporal interval is subsequent to the first temporal interval and is separated from the first temporal interval by a corresponding buffer interval, and the engagement event is associated with a cessation of the activity. The computer-implemented method also includes, using the at least one processor, transmitting at least a portion of the generated output data to a computing system. The computing system is configured to perform operations based on the portion of the output data.

Additionally, in some examples, a tangible, non-transitory computer-readable medium stores instructions that, when executed by at least one processor, cause the at least one processor to perform a method. The method includes generating an input dataset based on elements of first interaction data associated with an activity. The first interaction data is associated with a first temporal interval. The method also includes, based on the application of a trained artificial intelligence process to the input dataset, generating output data representative of a predicted likelihood of an occurrence of an engagement event during a second temporal interval. The second temporal interval is subsequent to the first temporal interval and is separated from the first temporal interval by a corresponding buffer interval, and the engagement event is associated with a cessation of the activity. The method also includes, using the at least one processor, transmitting at least a portion of the generated output data to a computing system. The computing system is configured to perform operations based on the portion of the output data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed exemplary embodiments, as set forth in the accompanying claims.

BRIEF DESCRIPTION OF THE DRAWINGS

FIG. 3 is a flowchart of an exemplary process for adaptively training a machine learning or artificial intelligence process, in accordance with some exemplary embodiments.

Like reference numbers and designations in the various drawings indicate like elements.

DETAILED DESCRIPTION

Figure 1A:
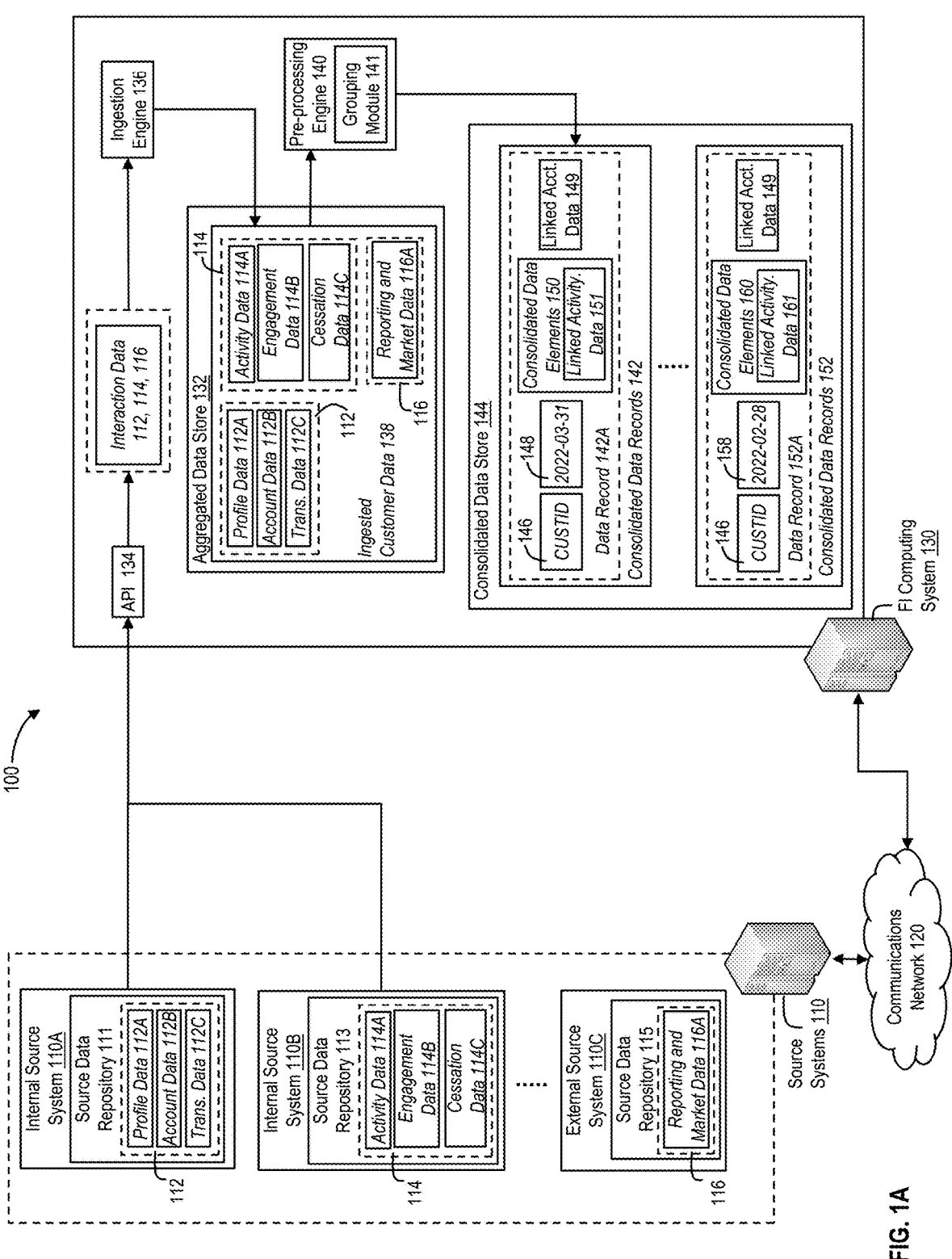
FIGS. 1A, 1B, and 1C are block diagrams illustrating portions of an exemplary computing environment, in accordance with some exemplary embodiments.

Modern financial institutions offer a variety of financial products or services to their customers, both through in-person branch banking and through various digital channels. The financial products and services may include one or more investment accounts that fund, and receive proceeds from, one or more trades of securities listed on corresponding exchanges, such as, but not limited to, brokerage accounts that fund purchases of, and receive proceeds from sales of, public listed or publicly traded, stocks and bonds. Each of the investment accounts may be held by a corresponding party (e.g., an individual investment account) or may be held jointly by a plurality of parties (e.g., a joint investment account), and that parties may include, but are not limited to, personal or business-banking customers of the financial institution. Further, in some instances, and to interact with the investment accounts and trade actively stocks, bonds, and other securities, the parties may access, via corresponding devices, a digital portal associated with the financial institution (e.g., a web page generated by an executed web browser, display screen of an executed mobile application, etc.), and the digital portal may enable each of the parties to initiate purchases or sales of stocks, bonds, or other securities, and to monitor a current balance of, and current transactions posted to, corresponding ones of the investment accounts.

For example, a party associated with a particular investment account may trade actively stocks, bonds, or other securities via the digital portal during one or more first temporal intervals, and computing systems of the financial institution may perform operations that track the party's engagement with the digital portal, e.g., by generating and storing data identifies each discrete login to the digital portal, a duration of the party's engagement with the digital portal (e.g., subsequent to login), or a number or type of actions taken during the party's engagement with the digital portal. In some examples, however, the party may transition from an active, regular engagement with the particular investment account via the accessed digital portal during the first temporal intervals to a less active engagement, or even to a lack of engagement, with the particular investment account during subsequent, second temporal intervals.

In some instances, the reduction in or absence of the party's engagement with the particular investment account need not imply that the party is no longer actively trading stocks, bonds, or other securities. For example, the party may hold multiple investment accounts issued by the financial institution, and for various reasons, the party may elect to fund ongoing purchases or sales of stocks, bonds, and other securities using additional, or alternate, ones of the investment or brokerage accounts issued by the financial institution. In other instances, the reduction in or absence of the party's engagement with the particular investment account may be associated with, and may be characterized by, a corresponding reduction in, or absence of, engagement with the digital portal associated with the financial institution. The reduction in, or absence of, engagement between the party and the digital portal may be indicative of a transition of the party from being an active trader that regularly purchases and sell securities using investment accounts issued by the financial institution to an inactive trader that ceases the previously regular, and active, trading activities. The transition from active to inactive trader may not only represent a loss of commissions and fees derived by the financial institution from the party's previously active trading habits, but may also represent a lost opportunity to provision additional financial services to the party that would enhance the relationship between the party and the financial institution.

Today, representatives of the financial institution may attempt to monitor the party's transition between active and inactive trader (e.g., based on engagement data characterizing the engagement between the party and the digital portal, based on trading volumes attributable to the party), and may reach out personally to the party to discuss, and remedy, the transition between active and inactive trader. Although these subjective, engagement-driven processes may be capable of identifying the transition in a party's trading habits subsequent to an initiation of that transition, these processes are often incapable of identifying often-subtle changes in a customer's spending or savings behavior, or in the customer's trading behavior, that, in real-time, would signal a likelihood of a future transition between trading activity and trading inactivity, and d enable the financial institution to apply one or more treatments to reduce the likelihood of any future transition involving the customer.

In some examples, described herein, a machine-learning or artificial-intelligence process may be adaptively trained to predict a likelihood of an occurrence of an activity-specific engagement event involving a customer of a financial institution during a future temporal interval using training data associated with a first prior temporal interval, and using validation data associated with a second, and distinct, prior temporal interval. The occurrence of activity-specific engagement may, for example, be associated with a cessation in the trading of securities by the customer using one or more investment accounts issued by the financial institution (e.g., a transition in the customer's trading habits from active to inactive), and/or the cessation in the trading activities may be associated with, and may be indicated by, a corresponding cessation of engagement with a digital portal associated with the trading activities. The machine-learning or artificial-intelligence process may include an ensemble or decision-tree process, such as a gradient-boosted decision-tree process (e.g., XGBoost model), and the training and validation data may include, but are not limited to, elements of profile, account, transaction, trading activity, and engagement data characterizing corresponding ones of the personal banking customers of the financial institution that hold, or previously held, individual or joint investment accounts issued by the financial institution (e.g., excluding business or corporate banking customers), along with elements of cessation data characterizing prior halts in the trading activity of these customers, or in the engagement with the digital portal associated with the trading activity. Further, in various implementations, the training and validation data may include external data, such as market trends or other outside factors influence financial choices, such as particular news information that may enhance a likelihood of cessation for a particular type of investor.

Through the implementation of the exemplary processes described herein, the one or more FI computing systems (e.g., which may collectively establish a distributed computing cluster associated with the financial institution) may perform operations that adaptively, and successively, train and validate the machine-learning or artificial-intelligence process based on corresponding subsets of the training and validation data. Further, the trained machine-learning or artificial-intelligence process (e.g., the trained gradient-boosted, decision-tree process described herein) may further ingest input datasets associated with one or more customers of the financial institution, and based on an application of the trained gradient-boosted, decision-tree process to the input datasets, the one or more FI computing systems may generate elements of output data indicative of a likelihood of an occurrence of the activity-specific cessation event (e.g., the cessation in trading activity and/or the cessation in the engagement or interaction with the digital portal) during a future temporal interval.

In some instances, the one or more FI computing systems may perform any of the exemplary processes described herein to generate input datasets associated with all, or a selected subset, of the customers of the financial institution, and to apply the trained machine-learning or artificial-intelligence process (e.g., the gradient-boosted, decision-tree process described herein) to the input datasets, in accordance with a predetermined schedule (e.g., on a daily basis, a weekly basis, a monthly basis, etc.). For example, the selected subset may include one or more personal banking customers that currently hold investments accounts issued by the financial institution, which support a trading of publicly traded stocks, publicly traded bonds, or other securities on corresponding exchanges. As described herein, the one or more FI computing systems may transmit the elements of output data generated through the application of the adaptively trained, gradient-boosted, decision-tree process to the input datasets to one or more additional computing systems associated with the financial institution, which may perform operations that engage, proactively, one or more of the customers (e.g., those associated with predicted occurrences of the targeted, investment-based events) in an attempt to maintain these customers' interactions with the digital portal and maintain the trading activity of these customers.

Certain of these exemplary processes, which adaptively train and validate a machine-learning or artificial-intelligence process using customer-specific training and validation datasets associated with respective training and validation periods, and which apply the trained and validated gradient-boosted, decision-tree process to additional customer-specific input datasets, may enable the one or more of the FI computing systems to predict, in real-time, a likelihood of an occurrence of the activity-specific engagement event involving one or more customers of the financial institution (e.g., the cessation or trading activities and/or the cessation of customer interaction with the digital portal) during a predetermined, future temporal interval, e.g., via an implementation of one or more parallelized, fault-tolerant distributed computing and analytical protocols across clusters of graphical processing units (GPUs) and/or tensor processing units (TPUs). These exemplary processes may, for example, be implemented in addition to, or as alternative to, existing processes through the representatives of the financial institution engage the customers directly and subsequent to a detection of a change in the customers' trading habits.

Figure 1B:
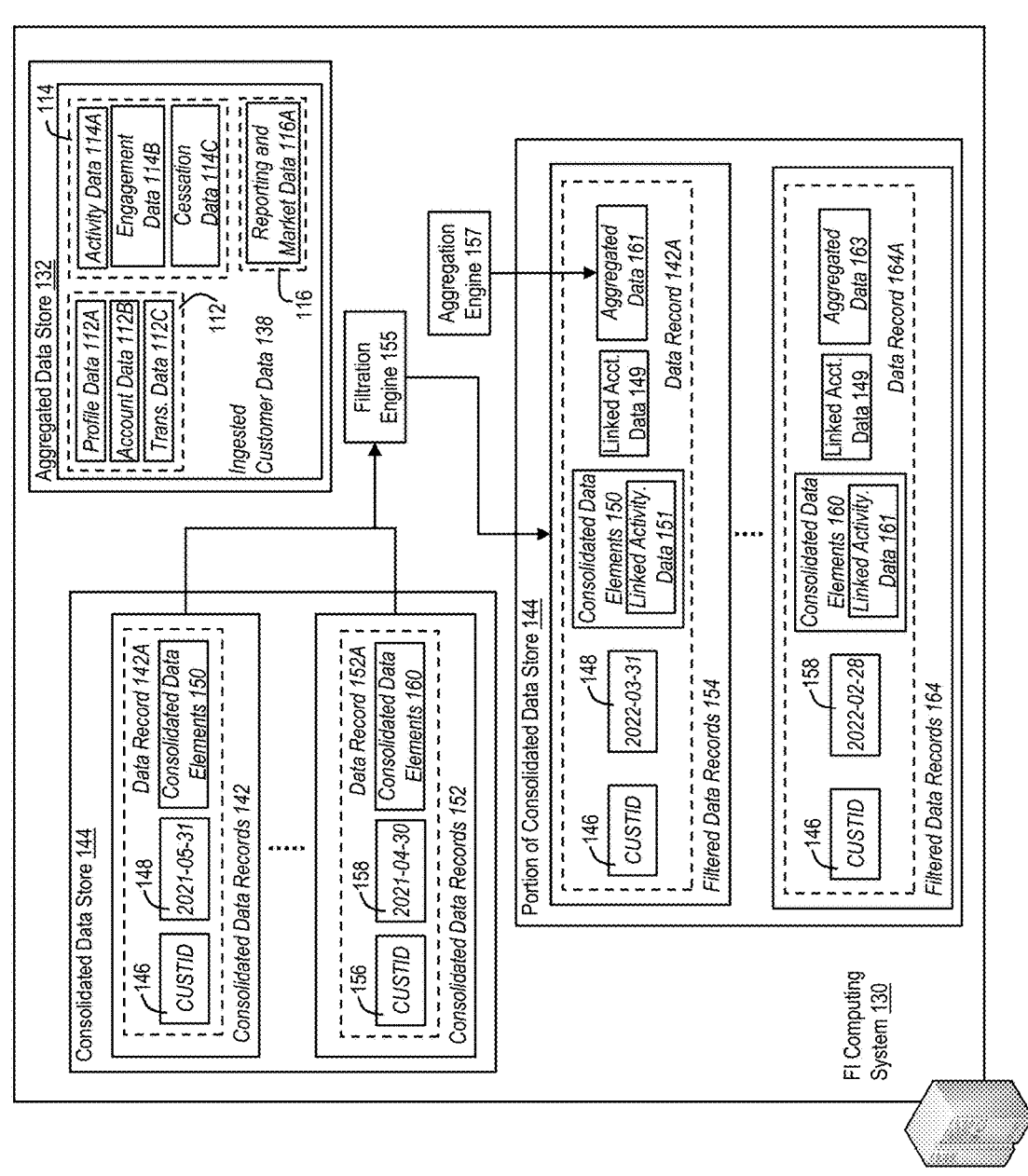
Figure 1C:
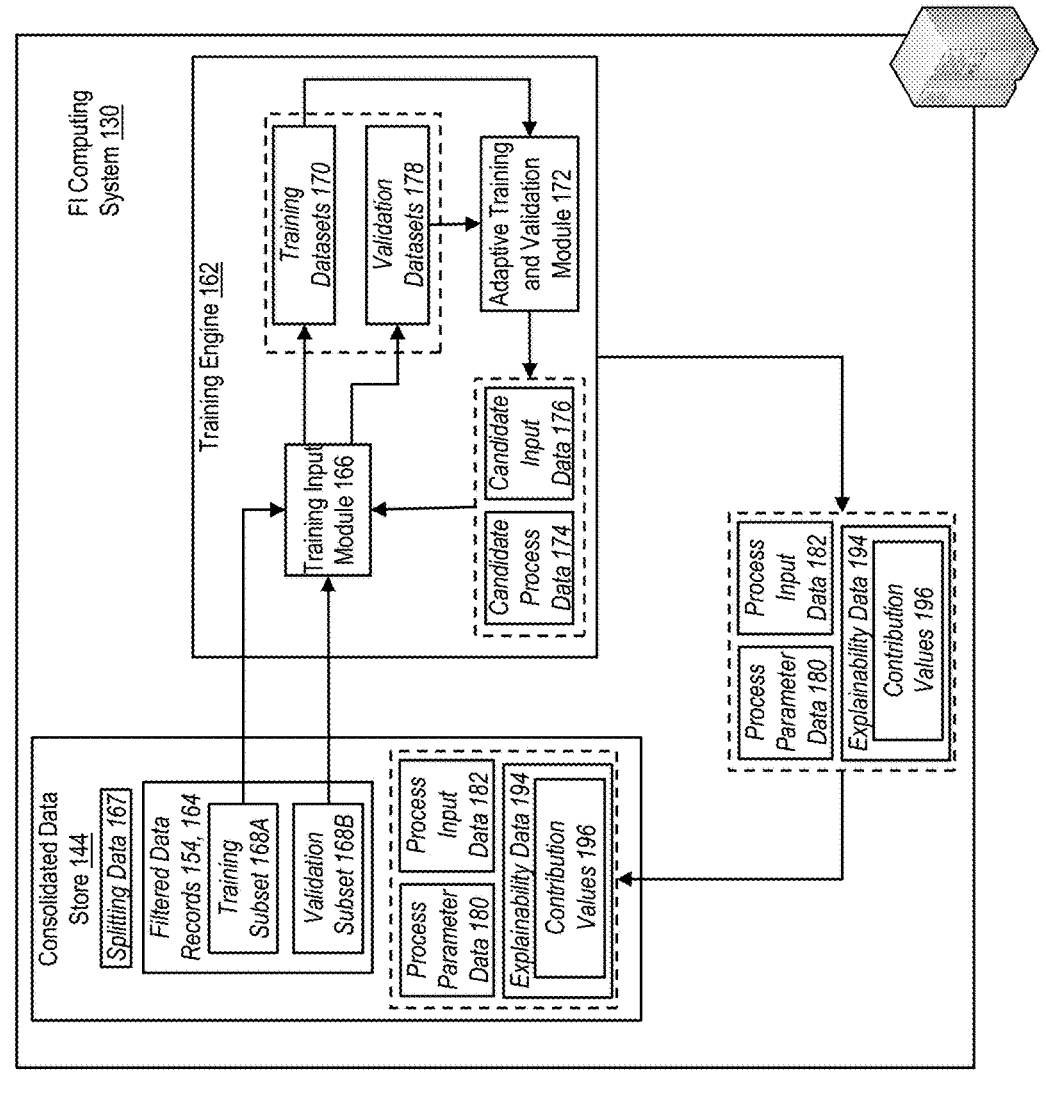

A. Exemplary Processes for Adaptively Training Gradient-Boosted, Decision Tree Processes Using Event Data in a Distributed Computing Environment FIGS. 1A, 1B, and 1C illustrate components of an exemplary computing environment 100, in accordance with some exemplary embodiments. For example, as illustrated in FIG. 1A, environment 100 may include one or more source systems 110, such as, but not limited to, internal source system 110A, internal source system 110B, and external source system 110C and a computing system associated with, or operated by, a financial institution, such as financial institution (FI) computing system 130. In some instances, each of source systems 110 (including internal source systems 110A and 110B and external source system 110C), and FI computing system 130 may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source systems 110 (including internal source systems 110A and 1108 and external source system 110C) and FI computing system 130 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source systems 110 (including internal source systems 110A and 1108 and external source system 110C) and FI computing system 130 may also include a communications interface, such as one or more wireless transceivers, coupled to the one or more processors for accommodating wired or wireless internet communication with other computing systems and devices operating within environment 100.

Further, in some instances, source systems 110 (including internal source systems 110A and 1108 and external source system 110C) and FI computing system 130 may each be incorporated into a respective, discrete computing system. In additional, or alternate, instances, one or more of source systems 110 (including internal source systems 110A and 1108 and external source system 110C) and FI computing system 130 may correspond to a distributed computing system having a plurality of interconnected, computing components distributed across an appropriate computing network, such as communications network 120 of FIG. 1A. For example, FI computing system 130 may correspond to a distributed or cloud-based computing cluster associated with, and maintained by, the financial institution, although in other examples, FI computing system 130 may correspond to a publicly accessible, distributed or cloud-based computing cluster, such as a computing cluster maintained by Microsoft Azure™, Amazon Web Services™, Google Cloud™, or another third-party provider.

In some instances, FI computing system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Through an implementation of the parallelized, fault-tolerant distributed computing and analytical protocols described herein, the distributed computing components of FI computing system 130 may perform any of the exemplary processes described herein, in accordance with a predetermined temporal schedule, to ingest elements of data associated with the customers of the financial institution, to preprocess the ingested data elements by filtering, aggregating, or down-sampling certain portions of the ingested data elements, and to store the preprocessed data elements within an accessible data repository (e.g., within a portion of a distributed file system, such as a Hadoop distributed file system (HDFS)).

Further, and through an implementation of the parallelized, fault-tolerant distributed computing and analytical protocols described herein, the distributed components of FI computing system 130 may perform operations in parallel that not only train adaptively a machine learning or artificial intelligence process (e.g., the gradient-boosted, decision-tree process described herein) using corresponding training and validation datasets extracted from temporally distinct subsets of the preprocessed data elements, but also apply the adaptively trained machine learning or artificial intelligence process to customer-specific input datasets and generate, in real time, elements of output data indicative of a likelihood of an occurrence of an activity-specific engagement event involving corresponding ones of the customers, and corresponding investment accounts held by the customers, during a future temporal interval, such as, but not limited to, a three-month temporal interval disposed between one and four months subsequent to a temporal prediction point. The implementation of the parallelized, fault-tolerant distributed computing and analytical protocols described herein across the one or more GPUs or TPUs included within the distributed components of FI computing system 130 may, in some instances, accelerate the training, and the post-training deployment, of the machine-learning and artificial-intelligence process when compared to a training and deployment of the machine-learning and artificial-intelligence process across comparable clusters of CPUs capable of processing a single operation per clock cycle.

Referring back to FIG. 1A, each of source systems 110 may maintain, within corresponding tangible, non-transitory memories, a data repository that includes confidential data associated with the customers of the financial institution. For example, internal source system 110A may be associated with, or operated by, the financial institution, and may maintain, within the corresponding one or more tangible, non-transitory memories, a source data repository 111 that includes one or more elements of internal interaction data 112. In some instances, internal interaction data 112 may include data that identifies or characterizes one or more customers of the financial institution and interactions between these customers and the financial institution, and examples of the confidential data include, but are not limited to, profile data 112A, account data 112B, and/or transaction data 112C.

In some instances, profile data 112A may include a plurality of data records associated with, and characterizing, corresponding ones of the customers of the financial institution. By way of example, and for a particular customer of the financial institution, the data records of profile data 112A may include, but are not limited to, one or more unique customer identifiers (e.g., an alphanumeric character string, such as a login credential, a customer name, etc.), residence data (e.g., a street address, etc.), other elements of contact data (e.g., a mobile number, an email address, etc.), values of demographic parameters that characterize the particular customer (e.g., ages, occupations, marital status, etc.), and other data characterizing the relationship between the particular customer and the financial institution. Further, profile data 112A may also include, for the particular customer, multiple data records that include corresponding elements of temporal data (e.g., a time or date stamp, etc.), and the multiple data records may establish, for the particular customer, a temporal evolution in the customer residence or a temporal evolution in one or more of the demographic parameter values.

Account data 112B may also include a plurality of data records that identify and characterize one or more financial products or financial instruments issued by the financial institution to corresponding ones of the customers. For example, the data records of account data 112B may include, for each of the financial products issued to corresponding ones of the customers, one or more identifiers of the financial product or instrument (e.g., a tokenized account number, expiration data, card-security-code, etc.), one or more unique customer identifiers (e.g., an alphanumeric character string, such as a login credential, a customer name, etc.), and additional information characterizing a balance or current status of the financial product or instrument (e.g., payment due dates or amounts, delinquent accounts statuses, etc.).

Examples of these financial products or financial instruments may include, but are not limited to, one or more deposit accounts issued to corresponding ones of the customers (e.g., a savings account, a checking account, etc.), one or more investment, brokerage, retirement accounts issued to corresponding ones of the customers by the financial institutions, and one or more secured credit products issued to corresponding ones of the customers by the financial institution (e.g., a home mortgage, a home-equity line-of-credit (HELOC), an auto loan, etc.). The financial products or financial instruments may also include one or more unsecured credit products issued to corresponding ones of the customers by the financial institution, and examples of these unsecured credit products may include, but are not limited to, a credit-card account, a personal loan, an unsecured line-of-credit, an overdraft protection (ODP) product, etc.

Further, transaction data 112C may include data records that identify, and characterize one or more initiated, settled, or cleared transactions involving respective ones of the customers and corresponding ones of the issued financial products, including the unsecured credit products described herein. Examples of these transactions include, but are not limited to, purchase transactions, bill-payment transactions, electronic funds transfers, currency conversions, purchases of securities, derivatives, or other tradeable instruments, electronic funds transfer (EFT) transactions, peer-to-peer (P2P) transfers or transactions, or real-time payment (RTP) transactions. For instance, and for a particular transaction involving a corresponding customer and corresponding financial product, the data records of transaction data 112C may include, but are not limited to, a customer identifier associated with the corresponding customer (e.g., the alphanumeric character string described herein, etc.), a counterparty identifier associated with a counterparty to the particular transaction (e.g., an alphanumeric character string, a counterparty name, a counterparty identifier, etc.), an identifier of the corresponding financial product or instrument involved in the particular transaction and held by the corresponding customer (e.g., a portion of a tokenized or actual account number, expiration date, card-security-code, etc.), and values of one or more parameters that characterize the particular transaction. In some instances, the transaction parameters may include but are not limited to a transaction amount, a transaction date or time, an identifier of one or more products or services involved in the transaction (e.g., a product name, a universal product code (UPC), etc.), or additional information describing the counterparty, such as a counterparty location, a standard industrial classification (SIC) code, or a merchant classification code (MCC) associated with the corresponding counterparty, etc.

Further, as illustrated in FIG. 1A, internal source system 110B may also be associated with, or operated by, the financial institution, and may maintain, within the corresponding one or more tangible, non-transitory memories, a source data repository 113 that includes one or more additional elements of internal interaction data 114, which may include elements of trading activity data 114A, engagement data 114B, and cessation data 114C. In some instances, trading activity data 114A may include one or more data records that identify and characterize trading activities of one or more customers of the financial institution over various temporal intervals. By way of example, each of the data records of trading activity data 114A may be associated with a discrete trade (e.g., purchase, sale, or transfer of securities) initiated by a corresponding customer of the financial institution and involving an investment account issued by the financial institution and held by the customer, and each data record of trading activity data 114A may include a unique identifier of the corresponding customer (e.g., an alphanumeric identifier or login credential, a customer name, etc.), temporal data characterizing an initiation time or date of the discrete trade, identifiers of the investment account (e.g., an tokenized account number, etc.), and information characterizing the trade, such as, but not limited to, a type of trade (purchase or sell), an identifier of the security (e.g., a stock ticker symbol), and/or a price or quantity of the security.

Further, engagement data 114B may include one or more data records that identify and characterize an engagement between customers of the financial institution and a digital portal associated with one or more investment accounts held by these customers (e.g., a web page generated by an executed web browser or a digital interface generated by an executed mobile application, etc.). As described herein, the digital portal may enable the customers to initiate purchases or sales of stocks, bonds, or other securities using the one or more investment accounts, and to monitor a current balance of, and current transactions posted to, corresponding ones of the investment accounts, and the data records of engagement data 114B may identify, and characterize, discrete interaction between a corresponding one of the customers and the digital portal. The frequency of discrete interactions between the customers and the digital portal, and the duration of these discrete interactions, may, in some instances, be indicative of a trading activity, of lack of trading activity, associated of the corresponding customers. For example, each of the data records of engagement data 114B may include a unique identifier of the corresponding customer (e.g., an alphanumeric identifier or login credential, a customer name, etc.), temporal data characterizing an initiation and duration of the discrete interaction between the corresponding customer and the digital portal, and additional information characterizing activities of the corresponding customer during the discrete interaction (e.g., a number of initiated trades, a number of initiated purchases or sales, etc.).

Cessation data 114C may include data records that characterize prior occurrences of halts in the trading activity of corresponding ones of the customers of the financial institution and/or prior halts in the engagement between corresponding ones of the customers of the financial institution and the digital portal associated with the trading activity. By way of example, each of the data records of cessation data 114C may be associated with a corresponding, customer-specific cessation in trading activity or portal-based interaction with the financial institution, and may include a unique identifier of a corresponding customer (e.g., an alphanumeric identifier or login credential, a customer name, etc.), an identifier of a corresponding, activity-specific event (e.g., an identifier of the customer-specific cessation in trading activity or portal-based interaction with the financial institution), and temporal data characterizing of the initiation or duration of the customer-specific cessation in trading activity or portal-based interaction (e.g., an initiation time or date).

External source system 110C may be associated with, or operated by, one or more judicial, regulatory, governmental, or reporting entities external to, and unrelated to, the financial institution, and external source system 110C may maintain, within the corresponding one or more tangible, non-transitory memories, a source data repository 115 that includes one or more elements of external interaction data 116. In some instances, external source system 110C may be associated with, or operated by, a reporting entity, such as a credit bureau, and external interaction data 116 may include elements of reporting and market data 116A that identify and characterize a customer's financial position, such as elements of credit-bureau data, or a value or performance of the customer's investment positions, such as elements of stock market index performance. In some instances, the elements of credit-bureau data for a customer of the financial institution may include, but are not limited to, a unique identifier of the customer (e.g., an alphanumeric identifier or login credential, a customer name, etc.), information identifying one or more financial products or instruments currently or previously held by the customer, information identifying a history of payments associated with these financial products or instruments, information identifying negative events associated with the customer (e.g., missed payments, collections, repossessions, etc.), and/or information identifying one or more credit inquiries involving the customer (e.g., inquiries by the financial institution, other financial institutions or business entities, etc.). The disclosed embodiments are, however, not limited to these exemplary elements of external interaction data 116, and in other instances, external interaction data 116 may include any additional or alternate elements of data associated with the customer and generated by the judicial, regulatory, governmental, or regulatory entities.

In some instances, FI computing system 130 may perform operations that establish and maintain one or more centralized data repositories within a corresponding one of the tangible, non-transitory memories. For example, as illustrated in FIG. 1A, FI computing system 130 may establish an aggregated data store 132, which maintains, among other things, elements of the profile, account, transaction, trading activity, engagement, and cessation data associated with one or more of the customers of the financial institution, which may be ingested by FI computing system 130 (e.g., from one or more of source systems 110) using any of the exemplary processes described herein. Aggregated data store 132 may, for instance, correspond to a data lake, a data warehouse, or another centralized repository established and maintained, respectively, by the distributed components of FI computing system 130, e.g., through a Hadoop™ distributed file system (HDFS).

For example, FI computing system 130 may execute one or more application programs, elements of code, or code modules that, in conjunction with the corresponding communications interface, establish a secure, programmatic channel of communication with each of source systems 110, including internal source systems 110A and 1106 and external source system 110C, across communications network 120, and may perform operations that access and obtain all, or a selected portion, of the elements of profile, account, transaction, trading activity, engagement, cessation, and reporting and market data maintained by corresponding ones of source systems 110. As illustrated in FIG. 1A, internal source system 110A may perform operations that obtain all, or a selected portion, of internal interaction data 112, including the data records of profile data 112A, account data 1126, and transaction data 112C, from source data repository 111, and transmit the obtained portions of internal interaction data 112 across communications network 120 to FI computing system 130. Further, internal source system 1106 may also perform operations that obtain all, or a selected portion, of internal interaction data 114, including the data records of trading activity data 114A, engagement data 1146, and cessation data 114C, from source data repository 113, and transmit the obtained portions of internal interaction data 114 across communications network 120 to FI computing system 130. Additionally, in some instances, external source system 110C may also perform operations that obtain all, or a selected portion, of external interaction data 116, including the data records of reporting and market data 116A, from source data repository 115, and transmit the obtained portions of external interaction data 116 across communications network 120 to FI computing system 130.

In some instances, and prior to transmission across communications network 120 to FI computing system 130, internal source system 110A, internal source system 1106, and external source system 110C may encrypt respective portions of internal interaction data 112 and internal interaction data 114 using a corresponding encryption key, such as, but not limited to, a corresponding public cryptographic key associated with FI computing system 130. Further, although not illustrated in FIG. 1A, each additional, or alternate, one of source systems 110 may perform any of the exemplary processes described herein to obtain, encrypt, and transmit additional, or alternate, portions of the profile, account, transaction, trading activity, engagement, cessation, and reporting and market data maintained locally maintained by source systems 110 across communications network 120 to FI computing system 130.

A programmatic interface established and maintained by FI computing system 130, such as application programming interface (API) 134, may receive the portions of internal interaction data 112 and 114, and the portions of external interaction data 116. As illustrated in FIG. 1A, API 134 may route the portions of internal interaction data 112 (including the data records of profile data 112A, account data 1126, and transaction data 112C), internal interaction data 114 (including the data records of trading activity data 114A, engagement data 114B, and cessation data 114C), and external interaction data 116 (including reporting and market data 116A, etc.) to a data ingestion engine 136 executed by the one or more processors of FI computing system 130. As described herein, the portions of internal interaction data 112 and 114, and/or the portions of external interaction data 116 may be encrypted, and executed data ingestion engine 136 may perform operations that decrypt each of the encrypted portions of internal interaction data 112 and 114, and/or the portions of external interaction data 116, using a corresponding decryption key, e.g., a private cryptographic key associated with FI computing system 130.

Executed data ingestion engine 136 may also perform operations that store the portions of internal interaction data 112 (including the data records of profile data 112A, account data 112B, and transaction data 112C), internal interaction data 114 (including the data records of trading activity data 114A, engagement data 114B, and cessation data 114C), and external interaction data 116 (including reporting and market data 116A) within aggregated data store 132, e.g., as ingested customer data 138. As illustrated in FIG. 1A, a pre-processing engine 140 executed by the one or more processors of FI computing system 130 may access ingested customer data 138, and perform any of the exemplary processes described herein to access elements of ingested customer data 138 (e.g., the data records of profile data 112A, account data 1126, transaction data 112C, trading activity data 114A, engagement data 114B, and cessation data 114C). In some instances, executed data preprocessing perform any of the exemplary data-processing operations described herein to parse the accessed elements of ingested customer data 138, to selectively aggregate, filter, and process the accessed elements of elements of ingested customer data 138, and to generate consolidated data records 142 that characterize corresponding ones of the customers, their interactions with the one or more investment accounts issued by the financial institution and digital portals associated with the investment accounts, and any associated activity-specific events (e.g., the customer-specific cessation in trading activity or portal-based interaction with the financial institution) during a corresponding temporal interval associated with the ingestion of internal interaction data 112 and 114 and external interaction data 116 by executed data ingestion engine 136.

Further, in some examples, executed pre-processing engine 140 may access the data records of ingested customer data 138. As described herein, each of the accessed data records may include an identifier of corresponding customer of the financial institution, such as a customer name or an alphanumeric character string, and executed pre-processing engine 140 may perform operations that map each of the accessed data records to a customer identifier assigned to the corresponding customer by FI computing system 130. By way of example, FI computing system 130 may assign a unique, alphanumeric customer identifier to each customer, and executed pre-processing engine 140 may perform operations that parse the accessed data records, identify each of the parsed data records that identifies the corresponding customer using a customer name, and replace that customer name with the corresponding alphanumeric customer identifier.

Executed pre-processing engine 140 may also perform operations that assign, to each of the accessed data records, a temporal identifier to each of the accessed data records, and that augment each of the accessed data records to include the newly assigned temporal identifier. In some instances, the temporal identifier may associate each of the accessed data records with a corresponding temporal interval, which may be indicative of reflect a regularity or a frequency at which FI computing system 130 ingests the elements of internal interaction data 112 and 114 from corresponding ones of source systems 110. For example, executed data ingestion engine 136 may receive elements of confidential customer data from corresponding ones of source systems 110 on a monthly basis (e.g., on daily basis, on the final day of the week, on the final day of the month), and in particular, may receive and store the elements of internal interaction data 112 and 114 from corresponding ones of source systems 110 on Mar. 31, 2022. In some instances, executed pre-processing engine 140 may generate a temporal identifier associated with the regular, monthly ingestion of internal interaction data 112 and 114 and external interaction data 116 on Mar. 31, 2022 (e.g., "2022-033-31"), and may augment the data records of ingested customer data 138 to include the generated temporal identifier. The disclosed embodiments are, however, not limited to temporal identifiers reflective of a regular, monthly ingestion of internal interaction data 112 and 114 and external interaction data 116 by FI computing system 130, and in other instances, executed pre-processing engine 140 may augment the accessed data records to include temporal identifiers reflective of any additional, or alternative, temporal interval during which FI computing system 130 ingests the elements of internal interaction data 112 and 114 and external interaction data 116.

Further, in some examples, executed pre-processing engine 140 may also perform operations that anonymize certain elements of account data 112B and transaction data 112C to protect confidential information. For example, executed pre-processing engine 140 may perform operations that remove or tokenize customers names, that replace confidential account numbers with tokenized or hashed values (e.g., through an irreversible, one-to-one mapping that cannot be readily reversed), or by adding nose to certain elements of account data 112B and transaction data 112C to anonymize confidential customer, account, transaction, or merchant data.

In some instances, executed pre-processing engine 140 may perform further operations that, for a particular customer of the financial institution during the temporal interval (e.g., represented by a pair of the customer and temporal identifiers described herein), obtain one or more data records of profile data 112A, account data 112B, transaction data 112C, trading activity data 114A, engagement data 114B, cessation data 114C, and external interaction data 116 (reporting and market data 116A) that include the pair of customer and temporal identifiers. Executed pre-processing engine 140 may perform operations that consolidate the one or more obtained data records and generate a corresponding one of consolidated data records 142 that includes the customer identifier and temporal identifier, and that is associated with, and characterizes, the particular customer of the financial institution across the temporal intervals. By way of example, executed pre-processing engine 140 may consolidate the obtained data records, which include the pair of customer and temporal identifiers, through an invocation of an appropriate Java-based SQL "join" command (e.g., an appropriate "inner" or "outer" join command, etc.).

Further, executed pre-processing engine 140 may perform any of the exemplary processes described herein to generate another one of consolidated data records 142 for each additional, or alternate, customer of the financial institution during the temporal interval (e.g., as represented by a corresponding customer identifier and the temporal interval). Executed pre-processing engine 140 may perform operations that store each of consolidated data records 142 within one or more tangible, non-transitory memories of FI computing system 130, such as consolidated data store 144. Consolidated data store 144 may, for instance, correspond to a data lake, a data warehouse, or another centralized repository established and maintained, respectively, by the distributed components of FI computing system 130, e.g., through a Hadoop™ distributed file system (HDFS).

In some instances, and as described herein, consolidated data records 142 may include a plurality of discrete data records, and each of these discrete data records may be associated with, and may maintain data characterizing, a corresponding one of the customers of the financial institution during the corresponding temporal interval (e.g., a month-long interval extending from May 1, 2021, to Mar. 31, 2022). For example, and for a particular customer of the financial institution, discrete data record 142A of consolidated data records 142 may include a customer identifier 146 of the particular customer (e.g., an alphanumeric character string "CUSTID"), a temporal identifier 148 of the corresponding temporal interval (e.g., a numerical string "2022-

03-31"), and consolidated data elements 150 of profile, account, transaction, trading activity, engagement, cessation and/or reporting and market data associated with that characterize the particular customer during the corresponding temporal interval (e.g., as consolidated from the data records of profile data 112A, account data 112B, transaction data 112C, trading activity data 114A, engagement data 114B, cessation data 114C, and/or reporting and market data 116A ingested by FI computing system 130 on Mar. 31, 2022).

Further, and as descried herein, one or more of the customers, including the particular customer associated with customer identifier 146, may hold, or be associated with, one or more individual or joint investment accounts (e.g., as identified within one or more elements of account data 112B and as characterized by one or more elements of trading activity data 114A, etc.) that capable of supporting trades of securities initiated by the particular customer via the digital portal. In some instances, the particular customer may elect to discontinue any trading activity involving a corresponding one of the individual or joint investment accounts during a temporal interval, but may elect to continue, or to increase, trading activity in an additional, or alternate, one of the individual or joint investment accounts available to the particular customer during the temporal interval. Although the particular customer may cease trading activities involving the corresponding one of the individual or joint investment accounts (or may cease engaging with the corresponding one of the individual or joint investment accounts via the digital portal), the particular customer may not be involved in an occurrence of an activity-specific engagement event associated with a cessation of trading activity during the temporal interval, as the particular customer elects to continue trading activity in additional, or alternate, one of the available individual or joint investment accounts.

In some instances, executed pre-processing engine 140 may perform operations, described herein, to identify one or more individual or joint investment accounts (e.g., as identified by elements of account data 112B) that are capable of supporting trading activity initiated by each, or a subset, of the customers of the financial institution identified and characterized by the elements of profile data 112A. For example, and for each of the individual investment accounts, the elements of account data 112B may associate a corresponding account identifier (e.g., a portion of a tokenized account number described herein, etc.) with a corresponding identifier of a "party" that holds the individual investment account (e.g., the customer identifier described herein, etc.). Further, and for each of the joint investment accounts, the elements of account data 112B may also associate a corresponding account identifier (e.g., a portion of a tokenized account number described herein, etc.) with a plurality of party identifiers associated with corresponding ones of the distinct parties capable of initiating trading activity in the joint account. As illustrated in FIG. 1A, a grouping module 141 of executed pre-processing engine 140 may perform operations that apply one or more graph-theory or clustering processes to the elements of account data 112B and identify, for at least a subset of the customers, including the particular customer associated with customer identifier 146, groups of connected components in a mapping of corresponding pairs of party and account identifiers that represent the one or more individual or joint investment accounts available to each of the subset of customers.

By way of example, each pair of party and account identifier may represent a node within the mapping, and if two nodes within the mapping (e.g., two pairs of party and account identifiers) are associated with a common party identifier (e.g., associated with a corresponding one of the customers, such as the particular customer), an edge may exist and interconnect these nodes. In some instances, and based on the application of the apply one or more graph-theory or clustering processes to the elements of account data 112B, executed grouping module 141 may establish the mapping the nodes (e.g., the discrete pairs of party and account identifiers, as described herein, and may perform operations that determine, for corresponding ones of the subset of customers, such as the particular customer associated with customer identifier 146, a grouping of interconnected nodes associated with corresponding ones of the customer identifiers. The account identifiers maintained within respective ones of the interconnected nodes of each of the determined groupings, may establish, for a corresponding one of the customers, a group of linked individual and joint investment account available to support trading activities initiated by the corresponding customer, and executed grouping module 141 may generate elements of linked-account data that include the account identifiers (e.g., the portions of the tokenized account numbers, etc.) of the group of linked individual and joint investment account, which executed grouping module 141 may store within a portion of a corresponding one of consolidated data records 142. For example, and for the particular customer associated with customer identifier 146, executed grouping module 141 may perform operations that generate elements of linked-account data 149, which include the account identifiers (e.g., the portions of the tokenized account numbers, etc.) of the group of linked individual and joint investment accounts available to the particular customer, that that store linked-account data 149 within a corresponding portion of data record 142A.

Further, and for each of consolidated data records 142 that maintain corresponding elements of linked-account data (e.g., that characterize the group of linked individual and joint investment accounts available to the corresponding customer), executed pre-processing engine 140 may access elements of consolidated data maintained within the corresponding one of consolidated data records 142, and determine whether the accessed elements of include elements of trading activity data characterizing each of the available group of linked individual and joint investment accounts during the corresponding temporal interval. If executed pre-processing engine 140 were to determine that elements of consolidated data maintained within a corresponding one of consolidated data records 142 fails to include elements of trading activity data characterizing one or more of the available group of linked individual and joint investment accounts during the corresponding temporal interval, executed pre-processing engine 140 may parse account data 1126 within aggregated data store 132 and obtain additional elements of trading activity data characterizing missing ones of the available group of linked individual and joint investment accounts, which executed pre-processing engine 140 may incorporate within a portion of the elements of consolidated data maintained within the corresponding one of consolidated data records 142.

For example, as illustrated in FIG. 1A, executed pre-processing engine 140 may determine that consolidated data elements 150 of data record 142A (e.g., that characterize the particular customer associated with customer identifier 146) fails to include elements of trading activity characterizing one or more of the group of linked individual and joint investment accounts associated with linked-account data 149, and executed pre-processing engine 140 may perform operations that obtain additional elements of trading activity data characterizing the missing ones of the group of linked individual and joint investment accounts available to the particular customer, and that package the additional elements of trading activity data, and corresponding ones of the account identifier, into portions of linked activity data 151, which executed pre-processing engine 140 may store within a portion of consolidated data elements 150. In other examples, executed pre-processing engine 140 may assign a null value to the trading activity data characterizing the missing ones of the group of linked individual and joint investment accounts available to the particular customer, which executed pre-processing engine 140 may package into a corresponding portion of linked activity data 151, e.g., in conjunction with the corresponding account identifier.

Further, in some instances, consolidated data store 144 may maintain each of consolidated data records 142, which characterize corresponding ones of the customers, their interactions with the financial institution and with other financial institutions, and any associated attrition events involving the financial planning services provisioned by the financial institution during the temporal interval, in conjunction with additional consolidated data records 152. Executed pre-processing engine 140 may perform any of the exemplary processes described herein to generate each of the additional consolidated data records 152, including based on elements of profile, account, transaction, trading activity, engagement, cessation, and reporting and market data ingested from source systems 110 during the corresponding prior temporal intervals.

As described herein, each of additional consolidated data records 152 may also include a plurality of discrete data records that are associated with and characterize a particular one of the customers of the financial institution during a corresponding one of the prior temporal intervals. For example, as illustrated in FIG. 1A, additional consolidated data records 152 may include one or more discrete data records, such as discrete data record 164A, associated with a prior temporal interval extending from Feb. 1, 2022, to Feb. 28, 2022. For the particular customer, discrete data record 164A may include a customer identifier 146 of the particular customer (e.g., an alphanumeric character string "CUSTID"), a temporal identifier 158 of the prior temporal interval (e.g., a numerical string "2022-02-28"), consolidated data elements 160 of profile, account, transaction, trading activity, engagement, cessation and/or reporting and market data that characterize the particular customer during the prior temporal interval extending from Feb. 1, 2022, to Feb. 28, 2022 (e.g., as consolidated from the data records ingested by FI computing system 130 on Feb. 28, 2022), and elements of linked-account data 149 that the account identifiers of the group of linked individual and joint investment accounts available to the particular customer, as described herein.

The disclosed embodiments are, however, not limited to the exemplary consolidated data records described herein, or to the exemplary temporal intervals described herein. In other examples, FI computing system 130 may generate, and the consolidated data store 144 may maintain any additional or alternate number of discrete sets of consolidated data records, having any additional or alternate composition, that would be appropriate to the elements of profile, account, transaction, trading activity, engagement, cessation, and reporting and market data ingested by FI computing system 130 at the predetermined intervals described herein. Further, in some examples, FI computing system 130 may ingest elements of profile, account, transaction, trading activity, engagement, cessation and/or reporting and market data from source systems 110 at any additional, or alternate, fixed or variable temporal interval that would be appropriate to the ingested customer data or to the adaptive training of the machine learning or artificial intelligence processes described herein.

Referring to FIG. 1B, a filtration engine 155 executed by the one or more processors of FI computing system 130 may access each of the data records of consolidated data records 142 and consolidated data records 152 maintained within consolidated data store 144 (e.g., data record 142A and 152A, as described herein), and perform operations that filter the accessed data records of consolidated data records 142 and 152 in accordance with one or more filtration criteria. Executed filtration engine 155 may, for example, determine that a subset of the data records of consolidated data records 142 and 152 are consistent with, and in compliance with, the one or more filtration criteria, and may perform operations that stored the filtered subset of the data records within a corresponding portion of consolidated data store 144, e.g., as filtered data records 164.

In some instances, the one or more filtration criteria may include a customer or account type-specific filtration criterion that, when processed by executed filtration engine 155, causes executed filtration engine 155 to exclude, from filtered data records 164, one or more of consolidated data records 142 and 152 identifying and characterizing a corresponding customer that fails to hold a particular account, service, or product during the corresponding temporal interval or particular customers that have insufficient amounts of data (e.g., new customers within the last six months, customers with no in-person interactions, etc.). For example, the application of one or more filtration criteria by executed filtration engine 155 may exclude, from filtered data records 164, one or more of consolidated data records 142 and 152 that are associated with, or characterize, a corporate, business, or small-business banking customer of the financial institution. Further, in some instances, the application of one or more filtration criteria by executed filtration engine 155 may exclude, from filtered data records 164, one or more of consolidated data records 142 and 152 that are associated with customers of the financial institution that fail to represent plausible candidates for early-stage contact and remediation by the financial institution, e.g., overdrawn customers, customers who have recently emptied accounts, etc. The disclosed embodiments are, however, not limited to these exemplary product, service, and other criteria, and in other instances, executed filtration engine 155 may apply any additional or alternate filtration criterion to the data records of consolidated data records 142 and 152 that would be appropriate to the customers of the financial institution, the financial institution, and consolidated data records 142 and 152, and that facilitate an adaptive training and validation of the exemplary machine-learning or artificial intelligence processes described herein.

For example, as illustrated in FIG. 1B, executed filtration engine 155 may access discrete data record 142A of consolidated data records 142, which includes customer identifier 146 of the particular customer (e.g., an alphanumeric character string "CUSTID"), temporal identifier 148 of the corresponding temporal interval (e.g., a numerical string "2022-03-31"), and consolidated data elements 150 that identify and characterize the particular customer during the corresponding temporal interval. Additionally, executed filtration engine 155 may access discrete data record 164A of consolidated data records 152, which includes customer identifier 146 of the particular customer (e.g., an alphanumeric character string "CUSTID"), temporal identifier 158 of the corresponding temporal interval (e.g., a numerical string "2021-04-30"), and consolidated data elements 160 that identify and characterize the particular customer during the corresponding temporal interval. Based on the application of the filtration criterion described herein to consolidated data elements 160, executed filtration engine 155 may establish that data record 142A satisfies each of the filtration criteria, and responsive to the determination that data record 142A satisfies the filtration criterion, executed filtration engine 155 may perform operations that store data record 142A within a portion of consolidated data store 144, e.g., as one of filtered data records 164.

In FIG. 1B, an aggregation engine 157 executed by the one or more processors of FI computing system 130 may access each of the data records of filtered data records 164. As described herein, each of the accessed data records may include corresponding elements of consolidated data that identify and characterize a particular customer of the financial institution during a corresponding temporal interval (e.g., the data records of profile data 112A, account data 112B, transaction data 112C, activity data, 114A, engagement data 114B, cessation data 114C, and reporting and market data 116A) associated with the particular customer and ingested by FI computing system 130. Further, and for each of the accessed data records, executed aggregation engine 157 may perform operations that process the corresponding elements of consolidated data and generate elements of aggregated account data that characterize a usage of one or more financial products or instruments during the corresponding temporal interval, elements of aggregated transaction data characterizing a spending, payment, or other transactional habit of the particular customer during the corresponding temporal interval, elements of aggregated trading activity data that characterize the trading activities of the particular customer during the corresponding temporal interval, and elements of aggregated engagement data that characterize the engagement between particular customer and digital portal associated with the one or more individual or joint investment accounts available to the particular customer.

By way of example, executed aggregation engine 157 may access data record 142A within filtered data records 164, which includes consolidated data elements 150 that identifies and characterizes a particular customer of the financial institution (e.g., associated with customer identifier 146) during a corresponding temporal interval (e.g., the one-month interval between Mar. 1, 2022, and Mar. 31, 2022, as specified by temporal identifier 148). Executed aggregation engine 157 may also perform operations that obtain, from consolidated data elements 150 elements of account data that identify and characterize the interactions between the particular customer and the one or more financial products or instruments issued by the financial institution during the corresponding temporal interval (e.g., one or more data records of account data 112B ingested by FI computing system 130), and elements of transaction data that identify and characterize one or more transactions initiated by the particular customer during the corresponding temporal interval (e.g., one or more data records of transaction data 112C ingested by FI computing system 130).

In some instances, executed aggregation engine 157 may perform operations that generate one or more elements of aggregated account data based on corresponding portions of the obtained account data elements, and that generate one or more elements of aggregated transaction data based on corresponding portions of the obtained transaction data elements. For example, the elements of aggregated account data may include, but are not limited to, an average of a total balance across one or more unsecured credit products held by the customer associated with customer identifier 146 during the temporal interval associated with temporal identifier 148 (e.g., an average balance across a credit-card account, a line-of-credit, a personal loan, etc.), a number of account interactions over the temporal interval, a number of transactions between a number of customer accounts over the temporal interval, etc. In some examples, the elements of aggregated transaction data 153 may include, but are not limited to, a total transaction amount attributable to one or more types of transactions initiated by the customer during the temporal interval, such as, but not limited to, real-time payment transactions, electronic funds transfers (EFT) transactions, etc. Executed aggregation engine 157 may perform operations that package one or more elements of aggregated account data into corresponding portions of aggregated data 161, which may be stored within data record 142A of filtered data records 164.

Further, and by way of example, the elements of aggregated transaction data may include values of aggregated transaction parameters that characterize a particular type or class of transaction, such as purchase transactions initiated by the customer associated with customer identifier 146 during the temporal interval associated with temporal identifier 148. For instance, the elements of aggregated transaction data 153 may include, among other things, a total transaction amount attributable to the initiated purchase transactions involving certain categories of merchants (e.g., based on corresponding SIC codes or MCCs maintained with the obtained transaction data elements, etc.), a total transaction amount attributable to the initiated purchase transactions involving certain purchased products or services, or a total transaction amount attributable to the initiated purchase transactions involving certain processing networks, such as, but not limited to, conventional payment rails or real-time payment rails. The disclosed embodiments are, however, not limited to these exemplary elements of aggregated account or transaction data, and in other instances, executed aggregation engine 157 may process filtered data records 164 and generate any additional, or alternate, aggregated data 163 including elements of aggregated account data that characterize the usage of the financial products or instruments held by the particular customer during the temporal interval, and any additional, or alternate, elements of aggregated transaction data characterizing a spending or purchasing habit of the customer during the temporal interval. Executed aggregation engine 157 may perform operations that package one or more elements of aggregated transaction data into corresponding portions of aggregated data 161.

Further, in some examples, executed aggregation engine 157 may also perform operations that obtain, from consolidated data elements 150 and/or linked activity data 151, elements of trading activity data that characterize the trading activities of the particular customer during the corresponding temporal interval and elements of engagement data that characterize the engagements between particular customer and digital portal associated with the one or more individual or joint investment accounts available to the particular customer during the corresponding temporal interval. In some instances, executed aggregation engine 157 may perform operations that generate one or more elements of aggregated trading activity data based on corresponding portions of the obtained elements of trading activity data, and that generate one or more elements of aggregated engagement data based on corresponding portions of the obtained elements of engagement data.

By way of example, the elements of aggregated trading activity data may include values of aggregated, or time-averaged, parameters that characterize a volume, a transaction amount, or a frequency of trades initiated by the particular customer and involving specific securities associated with corresponding identifiers (e.g., a stock ticker symbol, etc.) or securities associated with particular types of underlying entities (e.g., securities issued by financial institutions, retail stories, etc.), or a volume, a transaction amount, or a frequency trades initiated by the particular customer and involving specific exchanges or securities associated with particular geographic regions. Further, in some examples, the elements of aggregated engagement data may include values of aggregated, or time-averaged, engagement parameters that characterize a volume, a duration, or a frequency of discrete interactions between the particular customer and the digital portal during the temporal interval, or a values of aggregated, or time-averaged, engagement parameters that characterize a volume, transaction amount, or frequency of trades initiated by the particular customer during the temporal interval. Executed aggregation engine 157 may perform operations that package one or more elements of aggregated trading activity and engagement data into corresponding portions of aggregated data 161.

The disclosed embodiments are, however, not limited to these exemplary elements of aggregated account, transaction, or engagement data, and in other instances, executed aggregation engine 157 may process filtered data records 142A, and generate any additional, or alternate, elements of aggregated data 161 that characterize the usage of the financial products or instruments held by the particular customer during the temporal interval, that characterize a spending or purchasing habit of the customer during the temporal interval, and that characterize the interactions between the customer and the one or more provisioned financial planning services during the temporal interval. Further, although not illustrated in FIG. 1B, executed aggregation engine 157 may also perform any of the exemplary processes described herein to access each additional, or alternate, data record of filtered data records 164, to generate one or more elements of aggregated data associated with a corresponding one of the customers during a corresponding temporal interval, and to augment each of the additional, or alternate, data records to include respective ones of the generate elements of aggregated data.

Further, in some instances, consolidated data store 144 may maintain each of filtered data records 164 in conjunction with additional filtered data records 164. In some instances, executed pre-processing engine 140, executed filtration engine 155, and executed aggregation engine 157 may perform any of the exemplary processes, either individually or collectively, described herein to generate each of the additional filtered data records 164, including based on elements of profile, account, transaction, service, attrition, branch data, and/or external data (credit bureau, market data, etc.) ingested from source systems 110 during the corresponding prior temporal intervals.

As described herein, each of additional filtered data records 164 may also include a plurality of discrete data records that are associated with and characterize a particular one of the customers of the financial institution during a corresponding one of the prior temporal intervals. For example, additional filtered data records 164 may include one or more discrete data records, such as discrete data record 164A, associated with a prior temporal interval extending from Feb. 1, 2022, to Feb. 28, 2022. For the particular customer, discrete data record 164A may include a customer identifier 146 of the particular customer (e.g., an alphanumeric character string "CUSTID"), a temporal identifier 158 of the prior temporal interval (e.g., a numerical string "2022-02-28"), consolidated data elements 160 of profile, account, transaction, service, attrition, branch data, and/or reporting and market data associated with the particular customer during the prior temporal interval extending from Feb. 1, 2022, to Feb. 28, 2022 (e.g., as consolidated from the data records ingested by FI computing system 130 on Feb. 28, 2022), linked-account data 149 (as described herein), and aggregated data 163 of aggregated account, transaction, trading activity, and engagement data characterizing the particular customer during the prior temporal interval.

The disclosed embodiments are, however, not limited to the exemplary consolidated or filtered data records described herein, or to the exemplary temporal intervals described herein. In other examples, FI computing system 130 may generate, and the consolidated data store 144 may maintain any additional or alternate number of discrete sets of filtered data records, having any additional or alternate composition, that would be appropriate to the elements of profile, account, transaction, service, attrition, branch data, and/or reporting and market data ingested by FI computing system 130 at the predetermined intervals described herein. Further, in some examples, FI computing system 130 may ingest elements of profile, account, transaction, service, attrition, branch data, and/or reporting and market data from source systems 110 at any additional, or alternate, fixed or variable temporal interval that would be appropriate to the ingested customer data or to the adaptive training of the machine learning or artificial intelligence processes described herein.

In some instances, FI computing system 130 may perform any of the exemplary operations described herein to adaptively train a machine-learning or artificial-intelligence process to predict, at a temporal prediction point, a likelihood of an occurrence of activity-specific engagement event involving a customer of the financial institution during a future temporal interval using training datasets associated with a first prior temporal interval (e.g., a "training" interval), and using validation datasets associated with a second, and distinct, prior temporal interval (e.g., an out-of-time "validation" interval). As described herein, the activity-specific engagement event may be associated with one or more investment products provisioned to the customer by the financial institution, such as one or more individual or joint investment accounts capable of support trading activities initiated by the customer, e.g., at the temporal prediction point. Further, and as described herein, the occurrence of the activity-specific engagement event may correspond to a cessation, by the customer, of the trading activities associated with, and involving, the one or more individual or joint investment accounts provisioned by the financial institution (e.g., a transition in the customer's trading habits from active to inactive), and in some instances, the cessation in the trading activities may be associated with, and may be indicated by, a corresponding cessation of engagement with a digital portal associated with the trading activities. Through a prediction, in real-time, of an occurrence of an activity-specific engagement event involving a customer of the financial institution during a future temporal interval, certain of the exemplary processes described herein may enable a computing system of the financial institution to establish that a particular customer is likely to cease trading activating involving one or more individual or joint investment accounts during the future temporal interval, and that the particular customer represents a candidate for one or more remediation or treatment processes, which may reduce a likelihood of the future occurrence of the activity-specific engagement event.

As described herein, the machine-learning or artificial-intelligence process may include an ensemble or decision-tree process, such as a gradient-boosted decision-tree process (e.g., the XGBoost model), and the training and validation datasets may include, but are not limited to, values of adaptively selected features obtained, extracted, or derived from the filtered data records maintained within consolidated data store 144, e.g., from data elements maintained within the discrete data records of filtered data records 164 or the additional filtered data records 164. As described herein, each of the discrete data records may include additional elements of the consolidated and aggregated data that identify and characterize the corresponding customer, and the interactions between the corresponding customer and the financial institution, and elements of linked-account data identifying the one or more individual or joint investment accounts available to corresponding the corresponding customer.

For example, the distributed computing components of FI computing system 130 (e.g., that include one or more GPUs or TPUs configured to operate as a discrete computing cluster) may perform any of the exemplary processes described herein to adaptively train the machine learning or artificial intelligence process (e.g., the gradient-boosted, decision-tree process) in parallel through an implementation of one or more parallelized, fault-tolerant distributed computing and analytical processes. Based on an outcome of these adaptive training processes, FI computing system 130 may generate process coefficients, parameters, thresholds, and other process parameter data that collectively specify the trained machine learning or artificial intelligence process, and may store the generated process coefficients, parameters, thresholds, and other process parameter data within a portion of the one or more tangible, non-transitory memories, e.g., within consolidated data store 144.

Referring to FIG. 1C, a training engine 162 executed by the one or more processors of FI computing system 130 may access the consolidated data records maintained within consolidated data store 144, such as, but not limited to, filtered data records 164 or additional filtered data records 164. As described herein, each of the filtered data records, such as discrete data record 142A of filtered data records 164 or discrete data record 164A of additional filtered data records 164, may include a customer identifier of a corresponding one of the customers of the financial institution (e.g., customer identifier 146 of FIG. 1B) and a temporal identifier that associates the filtered data record with a corresponding temporal interval (e.g., temporal identifiers 148 and 158 of FIG. 1B). Further, as described herein, each of the filtered data records may include consolidated elements of profile, account, transaction, trading activity, engagement, cessation, and reporting and market data that characterize the corresponding one of the customers during the corresponding temporal interval (e.g., consolidated data elements 150 and 160 of FIG. 1A), and elements of linked-account data 149 identifying one or more individual or joint investment accounts available to support trading activities initiated by the corresponding one of the customers (e.g., linked-account data 149 and 159 of FIG. 1A).

Figures 1D, 1E:
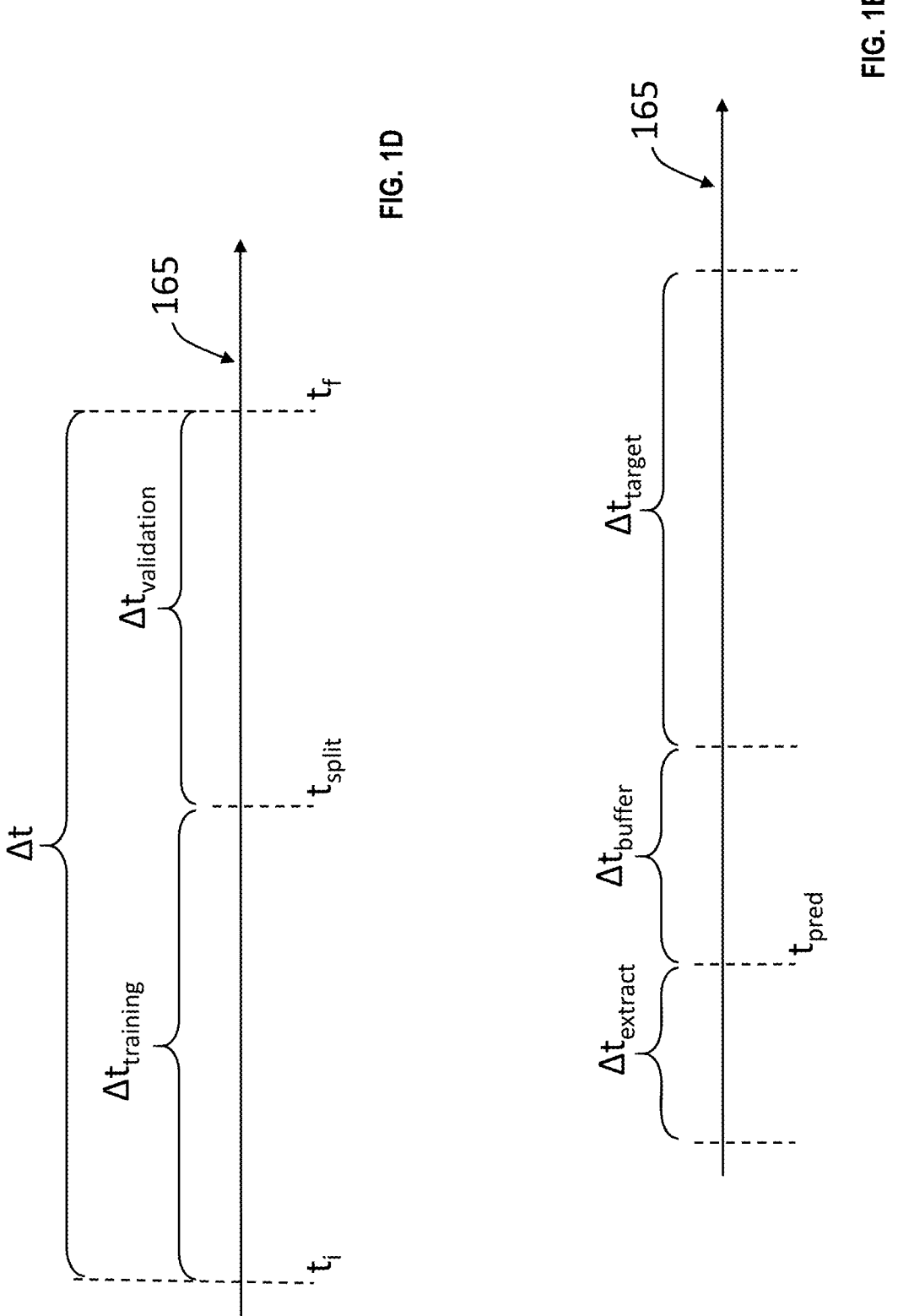
FIGS. 1D and 1E are diagrams of exemplary timelines for adaptively training a machine-learning or artificial intelligence process, in accordance with some exemplary embodiments.

In some instances, executed training engine 162 may parse the accessed consolidated data records, and based on corresponding ones of the temporal identifiers, determine that the consolidated elements of profile, account, transaction, trading activity, engagement, cessation and/or reporting and market data characterize the corresponding customers across a range of prior temporal intervals. Further, executed training engine 162 may also perform operations that decompose the determined range of prior temporal intervals into a corresponding first subset of the prior temporal intervals (e.g., the "training" interval described herein) and into a corresponding second, subsequent, and disjoint subset of the prior temporal intervals (e.g., the "validation" interval described herein). For example, as illustrated in FIG. 1D, the range of prior temporal intervals (e.g., shown generally as $\Delta t$ along timeline 165 of FIG. 1D) may be bounded by, and established by, temporal boundaries $t_i$ and $t_f$. Further, the decomposed first subset of the prior temporal intervals (e.g., shown generally as training interval $\Delta t_{training}$ along timeline 165 of FIG. 1D) may be bounded by temporal boundary $t_i$ and a corresponding splitting point $t_{split}$ along timeline 165, and the decomposed second subset of the prior temporal intervals (e.g., shown generally as validation interval $\Delta t_{validation}$ along timeline 165 of FIG. 1D) may be bounded by splitting point $t_{split}$ and temporal boundary $t_f$. In some instances, splitting point $t_{split}$ between training interval $\Delta t_{training}$ and validation interval $\Delta t_{validation}$ (e.g., as illustrated along timeline 165) may reduce instances of overfitting associated with the gradient-boosted decision tree process.

Referring back to FIG. 1C, executed training engine 162 may generate elements of splitting data 167 that identify and characterize the determined temporal boundaries (e.g., temporal boundaries $t_i$ and $t_f$) and the range of prior temporal intervals established by the determined temporal boundaries Further, the elements of splitting data 167 may also identify and characterize the splitting point (e.g., the splitting point $t_{split}$ described herein), the first subset of the prior temporal intervals (e.g., the training interval $\Delta t_{training}$ and corresponding boundaries described herein), and the second, and subsequent subset of the prior temporal intervals (e.g., the validation interval $\Delta t_{validation}$ and corresponding boundaries described herein). As illustrated in FIG. 1C, executed training engine 162 may store the elements of splitting data 167 within the one or more tangible, non-transitory memories of FI computing system 130, e.g., within consolidated data store 144.

As described herein, each of the prior temporal intervals may correspond to a one-month interval, and executed training engine 162 may perform operations that establish adaptively the splitting point between the corresponding temporal boundaries such that a predetermined first percentage of the consolidated data records are associated with temporal intervals (e.g., as specified by corresponding ones of the temporal identifiers) disposed within the training interval, and such that a predetermined second percentage of the consolidated data records are associated with temporal intervals (e.g., as specified by corresponding ones of the temporal identifiers) disposed within the validation interval. For example, the first predetermined percentage may correspond to seventy percent of the filtered data records, and the second predetermined percentage may corresponding to thirty percent of the filtered data records, although in other examples, executed training engine 162 may compute one or both of the first and second predetermined percentages, and establish the splitting point, based on the range of prior temporal intervals, a quantity or quality of the consolidated data records maintained within consolidated data store 144, or a magnitude of the temporal intervals (e.g., one-month intervals, two-week intervals, one-week intervals, one-day intervals, etc.).

In some examples, a training input module 166 of executed training engine 162 may perform operations that access the filtered data records maintained within consolidated data store 144. As described herein, each of the accessed data records (e.g., the discrete data records within filtered data records 164 or additional filtered data records 164) characterize a customer of the financial institution (e.g., identified by a corresponding customer identifier), the interactions of the customer with the financial institution. with investment accounts issued by the financial institution, with digital portals associated with these investment accounts, and with any associated activity-specific engagement events involving the customer during a particular temporal interval, e.g., a cessation, by the customer, of the trading activities associated with, and involving, the one or more individual or joint investment accounts provisioned by the financial institution. In some instances, and based on portions of splitting data 167, executed training input module 166 may perform operations that parse the filtered data records and determine: (i) a first subset 168A of these filtered data records are associated with the training interval $\Delta t_{training}$ and may be appropriate to training adaptively the gradient-boosted decision model during the training interval; and a (ii) second subset 168B of these filtered data records are associated with the validation interval $\Delta t_{validation}$ and may be appropriate to validating the adaptively trained gradient-boosted decision model during the validation interval.

As described herein, FI computing system 130 may perform operations that adaptively train a machine-learning or artificial-intelligence process (e.g., the gradient-boosted, decision-tree process described herein) to predict, during a current temporal interval, a likelihood of an occurrence of an activity-specific engagement event involving a customer and one or more investment accounts during a future temporal interval using training datasets associated with the training interval, and using validation datasets associated with the validation interval. For example, and as illustrated in FIG. 1E, the current temporal interval may be characterized by a temporal prediction point $t_{pred}$ along timeline 165, and the executed training engine 162 may perform any of the exemplary processes described herein to train adaptively machine-learning or artificial-intelligence process (e.g., the gradient-boosted, decision-tree process described herein) to predict the likelihood of occurrences of activity-specific cessation event during the future, target temporal interval $\Delta t_{target}$ based on input datasets associated with a corresponding prior extraction interval $\Delta t_{extract}$. Further, as illustrated in FIG. 1E, the target temporal interval $t_{target}$ may be separated temporally from the temporal prediction point $t_{pred}$ by a corresponding buffer interval $\Delta t_{buffer}$.

By way of example, the target temporal interval $\Delta t_{target}$ may be characterized by a predetermined duration, such as, but not limited to, one month or three months, and the prior extraction interval $\Delta t_{extract}$ may be characterized by a corresponding, predetermined duration, such as, but not limited to, a seven or thirteen-month period. Further, in some examples, the buffer interval $\Delta t_{buffer}$ may also be associated with a predetermined duration, such as, but not limited to, one month, and the predetermined duration of buffer interval $\Delta t_{buffer}$ may established by FI computing system 130 to separate temporally the customers' prior interactions with the financial institution and activity-specific cessation events from the future target temporal interval $\Delta t_{target}$. In other instances, the predetermined duration associated with buffer interval $\Delta t_{buffer}$ may be smaller than one month, including zero days, or may extend beyond one month.

In some instances, and prior to partitioning the filtered data records into corresponding ones of the first subset 168A and second subset 168B, executed training input module 166 may perform operations that partition the filtered data records maintained within consolidated data store 144 (e.g., the discrete data records within filtered data records 164 or additional filtered data records 164) into customer-specific subsets of filtered data records based on the customer identifier maintained within each of the filtered data records (e.g., customer identifier 146 of filtered data record 142A, customer identifier 146 of filtered data record 164A, etc.), and that sequentially order the filtered data records within each of the customer-specific subsets in accordance with the temporal identifies maintained within each of the filtered data records (e.g., temporal identifier 148 of filtered data record 142A, temporal identifier 158 of filtered data record 164A, etc.). Further, executed training input module 166 may also perform any of the exemplary processes described herein to augment one or more of the filtered data records (e.g., filtered data records 164 and 164, etc.) to include additional information characterizing a ground truth associated with the corresponding customer and temporal interval (as established by the corresponding pair of customer and temporal identifiers).

For example, and for a particular one of the sequentially ordered data record, such as discrete data record 142A of filtered data records 164, executed training input module 166 may obtain customer identifier 146 (e.g., "CUSTID"), which identifies the corresponding customer, and temporal identifier 148, which indicates data record 142A is associated with Mar. 31, 2022. Further, executed training input module 166 may also access the elements of linked-account data 149, and obtain a unique account identifier associated with each of the individual or joint investment accounts available to the corresponding customer. Based on customer identifier 146 and temporal identifier 148, executed training input module 166 may access cessation data 114C (e.g., as maintained within consolidated data store 144), and determine, for each of the individual or joint investment accounts, whether the whether the corresponding customer experienced an activity-specific engagement event (e.g., a customer-specific cessation in trading activity with a corresponding one of the individual or joint investment account) within the target interval $\Delta t_{target}$, which may be separated from the temporal interval associated with the data record 142A by the corresponding buffer interval $\Delta t_{buffer}$.

If, for example, executed training input module 166 were to determine that the corresponding customer ceased trading activities involving each of the available individual or joint investment accounts during target interval $\Delta t_{target}$, executed training input module 166 may establish an occurrence of the activity-specific engagement event involving the corresponding customer during target interval $\Delta t_{target}$, and may generate data characterizing data record 142A as a "positive" target for training or validation of the machine-learning or artificial-intelligence process (e.g., based on the actual occurrence of the activity-specific engagement event during target interval $\Delta t_{target}$. Alternatively, if executed training input module 166 were to determine that the corresponding customer failed to cease trading activities involving at least one of the available individual or joint investment accounts during target interval $\Delta t_{target}$, executed training input module 166 may establish a non-occurrence of the activity-specific engagement event involving the corresponding customer during target interval $\Delta t_{target}$, and may generate data characterizing data record 142A as a "negative" target for training or validation of the machine-learning or artificial-intelligence process (e.g., based on the non-occurrence of the activity-specific engagement event during target interval $\Delta t_{target}$). In some instances, as described herein, the established non-occurrence of the activity-specific engagement event may be indicative of an election, by the corresponding customer, to cease trading activities involving certain of the available individual or joint investment accounts, while maintaining trading activities associated with other of the available individual or joint investment accounts.

In some instances, executed training input module 166 may package the data characterizing a positive target (e.g., the actual occurrence of the service-specific attrition event within the target interval $\Delta t_{target}$) or a negative target (e.g., the non-occurrence of the service-specific attrition event within the target interval $\Delta t_{target}$) into a portion of the ground-truth information for the particular one of the filtered data records, and may augment the particular one of the filtered data records (e.g., as maintained within consolidated data store 144) to include the ground-truth data. Further, executed training input module 166 may also perform any of the exemplary processes described herein to generate a corresponding element of ground-truth information for all, or a selected subset, of the additional or alternate filtered data records maintained within consolidated data store 144, and to augment each, or the selected subset, of the additional or alternate filtered data records to include the corresponding element of ground-truth information.

Referring back to FIG. 1C, executed training input module 166 may perform any of the exemplary processes described herein to partition the filtered data records or the customer-specific sets of sequentially ordered data records maintained within consolidated data store 144 into subsets suitable for training adaptively the gradient-boosted, decision-tree process (e.g., which may be maintained in first subset 168A of filtered data records within consolidated data store 144) and for validating the adaptively trained, gradient-boosted, decision-tree process (e.g., which may be maintained in second subset 168B of filtered data records within consolidated data store 144). By way of example, executed training input module 166 may access splitting data 167, and establish the temporal boundaries for the training interval $\Delta t_{training}$ (e.g., temporal boundary $t_i$ and splitting point $t_{split}$) and the validation interval $\Delta t_{training}$ (e.g., splitting point $t_{split}$ and temporal boundary $t_f$). Further, executed training input module 166 may also parse each of the sequentially ordered data records of the customer-specific sets, access the corresponding temporal identifier, and determine the temporal interval associated with the each of sequentially ordered data records.

If, for example, executed training input module 166 were to determine that the temporal interval associated with a corresponding one of the sequentially ordered data records is disposed within the temporal boundaries for the training interval $\Delta t_{training}$, executed training input module 166 may determine that the corresponding data record may be suitable for training, and may perform operations that include the corresponding data record within a portion of the first subset 168A (e.g., that store the corresponding data record within a portion of consolidated data store 144 associated with first subset 168A). Alternatively, if executed training input module 166 were to determine that the temporal interval associated with a corresponding one of the sequentially ordered data records is disposed within the temporal boundaries for the validation interval $\Delta t_{validation}$, executed training input module 166 may determine that the corresponding data record may be suitable for validation, and may perform operations that include the corresponding data record within a portion of the second subset 168B (e.g., that store the corresponding data record within a portion of consolidated data store 144 associated with second subset 168B). Executed training input module 166 may perform any of the exemplary processes described herein to determine the suitability of each additional, or alternate, one of the sequentially ordered data records of the customer-specific sets for adaptive training, or alternatively, validation, of the gradient-boosted, decision-tree process.

Referring back to FIG. 1C, executed training input module 166 may perform operations that generate a plurality of training datasets 170 based on elements of data obtained, extracted, or derived from all or a selected portion of first subset 168A of the consolidated data records, and that train adaptively the machine-learning or artificial-intelligence process to predict, at a temporal prediction point, a likelihood of occurrences of likelihood of occurrences of activity-specific engagement events involving customers of the financial institution during a future temporal interval (e.g., a cessation, by each of the customers, of the trading activities associated with, and involving, the one or more individual or joint investment accounts provisioned by the financial institution). By way of example, and as describe herein, the machine-learning or artificial-intelligence process may include a gradient-boosted decision-tree process, and the plurality of training datasets 170 may, when provisioned to an input layer of the gradient-boosted decision-tree process, enable executed training engine 162 to train adaptively the gradient-boosted decision-tree process to predict, at the temporal prediction point, a likelihood of occurrences of the activity-specific engagement events involving the customers of the financial institution during the future temporal interval.

By way of example, each of the plurality of training datasets 170 may be associated with a corresponding one of the customers of the financial institution and a corresponding temporal interval, and may include, among other things a customer identifier associated with that corresponding customer and a temporal identifier representative of the corresponding temporal interval, as described herein. Each of the plurality of training datasets 170 may also include elements of data (e.g., feature values) that characterize the corresponding one of the customers, the corresponding customer's interaction with the financial institution or with other financial institution, and/or an occurrence (or non-occurrence) of activity-specific cessation events involving the corresponding customer during a temporal interval disposed prior to the corresponding temporal interval, e.g., the extraction interval $\Delta t_{extract}$ described herein. Further, each of training datasets 170 may also include an element of ground-truth data, e.g., the positive or negative target described herein.

In some instances, executed training input module 166 may perform operations that identify, and obtain or extract, one or more of the features values from the filtered data records maintained within first subset 168A and associated with the corresponding one of the customers. The obtained or extracted feature values may, for example, include elements of the profile, account, transaction, trading activity, engagement, cessation and/or reporting and market data described herein (e.g., which may populate the filtered data records maintained within first subset 168A). Further, in some instances, executed training input module 166 may perform operations that compute, determine, or derive one or more of the features values based on elements of data extracted or obtained from the filtered data records maintained within first subset 168A. In some instances, the computed, determined, or derived features values may include, but are not limited to, a temporal interval between a current time and a prior trade initiated by a corresponding one of the customers via the digital portal, or a temporal interval between a current time and a prior interaction of engagement of a corresponding one of the customers with the digital portal, Executed training input module 166 may provide training datasets 170 as an input to an adaptive training and validation module 172 of executed training engine 162. In some instances, and upon execution by the one or more processors of FI computing system 130, executed adaptive training and validation module 172 may perform operations that adaptively train the machine-learning or artificial-intelligence process against the elements of training data included within each of training datasets 170. By way of example, and as described herein, the machine-learning or artificial-intelligence process may include a gradient-boosted, decision-tree process, and executed adaptive training and validation module 172 may perform operations that establish a plurality of nodes and a plurality of decision trees for the gradient-boosted, decision-tree process, which may ingest and process the elements of training data (e.g., the customer identifiers, the temporal identifiers, the feature values, etc.) maintained within each of the plurality of training datasets 170. Further, and based on the execution of adaptive training and validation module 172, and on the ingestion of each of training datasets 170 by the established nodes of the gradient-boosted, decision-tree process, FI computing system 130 may perform operations that adaptively train the gradient-boosted, decision-tree process against the elements of training data included within each of training datasets 170.

In some examples, the distributed components of FI computing system 130 may execute adaptive training and validation module 172, and may perform any of the exemplary processes described herein in parallel to adaptively train the machine-learning or artificial-intelligence process against the elements of training data included within each of training datasets 170. The parallel implementation of adaptive training and validation module 172 by the distributed components of FI computing system 130 may, in some instances, be based on an implementation, across the distributed components, of the parallelized, fault-tolerant distributed computing and analytical protocols described herein (e.g., the Apache Spark™ distributed, cluster-computing framework, etc.).

Through the performance of these adaptive training processes, executed adaptive training and validation module 172 may perform operations that compute one or more candidate process parameters that characterize the adaptively trained, machine-learning or artificial-intelligence process (e.g., the trained gradient-boosted, decision-tree process), and package the candidate process parameters into corresponding portions of candidate process data 174. In some instances, the candidate process parameters included within candidate process data 174 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, and based on the performance of these adaptive training processes, executed adaptive training and validation module 172 may also generate candidate input data 176, which specifies a candidate composition of an input dataset for the adaptively trained, machine-learning or artificial-intelligence process (e.g., which be provisioned as inputs to the nodes of the decision trees of the adaptively trained, gradient-boosted, decision-tree process).

As illustrated in FIG. 1C, executed adaptive training and validation module 172 may provide candidate process data 174 and candidate input data 176 as inputs to executed training input module 166 of training engine 162, which may perform any of them exemplary processes described herein to generate a plurality of validation datasets 178 having compositions consistent with candidate input data 176. As described herein, the plurality of validation datasets 178 may, when provisioned to, and ingested by, the nodes of the decision trees of the adaptively trained, gradient-boosted, decision-tree process, enable executed training engine 162 to validate the predictive capability and accuracy of the adaptively trained, gradient-boosted, decision-tree process, for example, based on elements of ground-truth data incorporated within the validation datasets 178, or based on one or more computed metrics, such as, but not limited to, computed precision values, computed recall values, and computed area under curve (AUC) for receiver operating characteristic (ROC) curves or precision-recall (PR) curves.

By way of example, executed training input module 166 may parse candidate input data 176 to obtain the candidate composition of the input dataset, which not only identifies the candidate elements of customer-specific data included within each validation dataset (e.g., the candidate feature values described herein), but also a candidate sequence or position of these elements of customer-specific data within the validation dataset. Examples of these candidate feature values include, but are not limited to, one or more of the feature values extracted, obtained, computed, determined, or derived by executed training input module 166 and packaged into corresponding portions of training datasets 170, as described herein.

Further, in some examples, each of the plurality of validation datasets 178 may be associated with a corresponding one of the customers of the financial institution, and with a corresponding temporal interval within the validation interval $\Delta t_{validation}$, and executed training input module 166 may access the consolidated data records maintained within second subset 168B of consolidated data store 144, and may perform operations that extract, from an initial one of the consolidated data records, a customer identifier (which identifies a corresponding one of the customers of the financial institution associated with the initial one of the consolidated data records) and a temporal identifier (which identifies a temporal interval associated with the initial one of the consolidated data records). Executed training input module 166 may package the extracted customer identifier and temporal identifier into portions of a corresponding one of validation datasets 178, e.g., in accordance with candidate input data 176.

Executed training input module 166 may perform operations that access one or more additional ones of the consolidated data records that are associated with the corresponding one of the customers (e.g., that include the customer identifier) and as associated with a temporal interval (e.g., based on corresponding temporal identifiers) disposed prior to the corresponding temporal interval, e.g., within the extraction interval $\Delta t_{extract}$ described herein. Based on portions of candidate input data 176, executed training input module 166 may identify, and obtain or extract one or more of the feature values of the validation datasets from within the additional ones of the consolidated data records within second subset 168B. Further, in some examples, and based on portions of candidate input data 176, executed training input module 166 may perform operations that compute, determine, or derive one or more of the features values based on elements of data extracted or obtained from further ones of the consolidated data records within second subset 168B.

Executed training input module 166 may package each of the obtained, extracted, computed, determined, or derived feature values into corresponding positions within the initial one of validation datasets 178, e.g., in accordance with the candidate sequence or position specified within candidate input data 176. Further, executed training input module 166 may perform any of the exemplary processes described herein to generate, and package into an appropriate position the corresponding one of validation datasets 178, an element of ground-truth data indicative of the presence or absence of a activity-specific engagement event associated with the corresponding one of the customers within the target interval $\Delta t_{target}$.

In some instances, executed training input module 166 may perform any of the exemplary processes described herein to generate additional, or alternate, ones of validation datasets 178 based on the elements of data maintained within the consolidated data records of second subset 178B. For example, each of the additional, or alternate, ones of validation datasets 178 may associated with a corresponding, and distinct, pair of customer and temporal identifiers, and as such, corresponding customers of the financial institution and corresponding temporal intervals within validation interval $\Delta t_{validation}$. Further, executed training input module 166 may perform any of the exemplary processes described herein to generate an additional, or alternate, ones of validation datasets 178 associated with each unique pair of customer and temporal identifiers maintained within the consolidated data records of second subset 178B, and in other instances a number of discrete validation datasets within validation datasets 178 may be predetermined or specified within candidate input data 176.

Referring back to FIG. 1C, executed training input module 166 may provide the plurality of validation datasets 178 as inputs to executed adaptive training and validation module 172. In some examples, executed adaptive training and validation module 172 may perform operations that apply the adaptively trained, machine-learning or artificial-intelligence process to respective ones of validation datasets 178 (e.g., based on the candidate process parameters within candidate process data 174, as described herein), and that generate elements of output data based on the application of the adaptively trained, machine-learning or artificial-intelligence process to corresponding ones of validation datasets 178.

As described herein, each of the each of elements of output data may be generated through the application of the adaptively trained, machine-learning or artificial-intelligence process (e.g., the trained gradient-boosted, decision-tree process) to a corresponding one of validation datasets 178, which may include, among other things, a customer identifier (e.g., identifying a corresponding customer of the financial institution), a temporal identifier (e.g., identifying a corresponding temporal interval), and an element of ground-truth data, which indicates whether the corresponding customer is involved in an actual service-specific attrition event during a future temporal interval, e.g., the target interval $\Delta t_{target}$ separated from the corresponding temporal interval by buffer interval $\Delta t_{buffer}$. Further, as described herein, each of elements of output data may be representative of a predicted likelihood of an occurrence of a service-specific attrition event involving, or associated with, the corresponding customer during the target interval $\Delta t_{target}$, and in some instances, the predicted likelihood may be represented by a numerical score ranging from zero (e.g., indicative of a minimal predicted likelihood) to unity (e.g., indicative of a maximum predicted likelihood).

Executed adaptive training and validation module 172 may perform operations that compute a value of one or more metrics that characterize a predictive capability, and an accuracy, of the adaptively trained, machine-learning or artificial-intelligence process based on the generated elements of output data and corresponding ones of validation datasets 178. The computed metrics may include, but are not limited to, one or more recall-based values for the adaptively trained, gradient-boosted, decision-tree process (e.g., "recall@5," "recall@10," "recall@20," etc.), and additionally, or alternatively, one or more precision-based values for the adaptively trained, gradient-boosted, decision-tree process. Further, in some examples, the computed metrics may include a computed value of an area under curve (AUC) for a precision-recall (PR) curve associated with the adaptively trained, gradient-boosted, decision-tree process, and additional, or alternatively, computed value of an AUC for a receiver operating characteristic (ROC) curve associated with the adaptively trained, gradient-boosted, decision-tree process. The disclosed embodiments are, however, not limited to these exemplary computed metric values, and in other instances, executed adaptive training and validation module 172 may compute a value of any additional, or alternate, metric appropriate to validation datasets 178, the elements of ground-truth data, or the adaptively trained, machine-learning or artificial-intelligence process (e.g., the trained, gradient-boosted, decision-tree process)

In some examples, executed adaptive training and validation module 172 may also perform operations that determine whether all, or a selected portion of, the computed metric values satisfy one or more threshold conditions for a deployment of the adaptively trained, machine-learning or artificial-intelligence process and a real-time application to elements of profile, account, transaction, trading activity, engagement, cessation, and reporting and market data, as described herein. For instance, the one or more threshold conditions may specify one or more predetermined threshold values for the adaptively trained, gradient-boosted, decision-tree model, such as, but not limited to, a predetermined threshold value for the computed recall-based values, a predetermined threshold value for the computed precision-based values, and/or a predetermined threshold value for the computed AUC values. In some examples, executed adaptive training and validation module 172 that establish whether one, or more, of the computed recall-based values, the computed precision-based values, or the computed AUC values exceed, or fall below, a corresponding one of the predetermined threshold values and as such, whether the adaptively trained, machine-learning or artificial-intelligence process satisfies the one or more threshold requirements for deployment.

If, for example, executed adaptive training and validation module 172 were to establish that one, or more, of the computed metric values fail to satisfy at least one of the threshold requirements, FI computing system 130 may establish that the adaptively trained, machine-learning or artificial-intelligence process is insufficiently accurate for deployment and a real-time application to the elements of profile, account, transaction, service, attrition, and/or branch data described herein. Executed adaptive training and validation module 172 may perform operations (not illustrated in FIG. 1C) that transmit data indicative of the established inaccuracy to executed training input module 166, which may perform any of the exemplary processes described herein to generate one or more additional training datasets and to provision those additional encrypted training datasets to executed adaptive training and validation module 172. In some instances, executed adaptive training and validation module 172 may receive the additional training datasets, and may perform any of the exemplary processes described herein to train further the machine-learning or artificial-intelligence process against the elements of training data included within each of the additional training datasets.

Alternatively, if executed adaptive training and validation module 172 were to establish that each computed metric value satisfies threshold requirements, FI computing system 130 may deem the machine-learning or artificial-intelligence process adaptively trained, and ready for deployment and real-time application to the elements of profile, account, transaction, service, attrition, and/or branch data described herein. In some instances, executed adaptive training and validation module 172 may generate process parameter data 180 that includes the model parameters of the adaptively trained, machine-learning or artificial-intelligence process, such as, but not limited to, each of the candidate process parameters specified within candidate process data 174. Further, executed adaptive training and validation module 172 may also generate process input data 182, which characterizes a composition of an input dataset for the adaptively trained, machine-learning or artificial-intelligence process and identifies each of the discrete data elements within the input data set, along with a sequence or position of these elements within the input data set (e.g., as specified within candidate input data 176). As illustrated in FIG. 1C, executed adaptive training and validation module 172 may perform operations that store process parameter data 180 and process input data 182 within the one or more tangible, non-transitory memories of FI computing system 130, such as consolidated data store 144.

Further, in some examples, executed adaptive training and validation module 172 may also perform operations that generate one or more elements of explainability data 194 that, among other things, characterize a contribution of each of the discrete feature values specified within process input data 182 to the predicted likelihood of the occurrences of the service-specific attrition events involving the customers of the financial institution (e.g., the current participants in the one or more provisioned financial planning services) during the target interval $\Delta t_{target}$. By way of example, executed adaptive training and validation module 172 may perform operations that compute a contribution value indicative of a relative contribution and importance of each of the discrete features to the predicted likelihoods of the occurrences of the service-specific attrition events based on a determined number of branching points that utilize the corresponding feature, based on a computed Shapley feature value for the corresponding feature, or based on any additional or alternate, metric indicative of the contribution of the corresponding feature to the predicted likelihoods of the occurrences of the service-specific attrition events. As illustrated in FIG. 1B, adaptive training and validation module 172 may package the computed contribution values into corresponding portions of explainability data 194, e.g., as contribution values 196, and may store explainability data 194 within the one or more tangible, non-transitory memories of FI computing system 130, such as consolidated data store 144.

B. Exemplary Processes for Predicting Future Occurrences of Activity-Specific Cessation Events Using Trained, Machine-Learning or Artificial-Intelligence Processes In some examples, one or more computing systems associated with or operated by a financial institution, such as one or more of the distributed components of FI computing system 130, may perform operations that adaptively train a machine learning or artificial intelligence process to predict, at a temporal prediction point, a likelihood of an occurrence of activity-specific engagement event involving a customer of the financial institution during a future temporal interval using training datasets associated with a first prior temporal interval, and using validation datasets associated with a second, and distinct, prior temporal interval. As described herein, the activity-specific engagement event may be associated with one or more investment products provisioned to the customer by the financial institution, such as one or more individual or joint investment accounts capable of support trading activities initiated by the customer, e.g., at the temporal prediction point. Further, and as described herein, the occurrence of the activity-specific engagement event may correspond to a cessation, by the customer, of the trading activities associated with, and involving, the one or more individual or joint investment accounts provisioned by the financial institution. Further, and as described herein, the training and validation data may include, but are not limited to, elements of profile, account, transaction, trading activity, engagement, cessation, and reporting and market data associated with current or past participants in the provisioned financial planning services, along with elements of attrition data identifying and characterizing prior occurrences of service-specific attrition events associated with, or involving, the corresponding customers. Further and as described herein, the training and validation data may include, but are not limited to, elements of profile, account, transaction, trading activity, engagement, and/or reporting and market data characterizing corresponding ones of the customers that hold individual or joint investment accounts available to support trading activities, along with elements of cessation data identifying and characterizing prior occurrences of activity-specific engagement events associated with, or involving, the corresponding customers.

In some instances, FI computing system 130 may perform any of the exemplary processes described herein to generate input datasets associated with all, or a selected subset, of the customers of the financial institution (e.g., that hold the available individual or joint investments accounts), and to apply the adaptively trained machine-learning or artificial-intelligence process, such as the adaptively trained, gradient-boosted, decision-tree process described herein, to each of the input datasets. Based on the application of the adaptively trained machine-learning or artificial-intelligence process to each of the input datasets, FI computing system 130 may perform any of the exemplary processes described herein to generate elements of output data, each of which may indicate of a predicted likelihood of occurrence of an activity-specific engagement event involving corresponding ones of the customers (e.g., a cessation, by the corresponding customer, of the trading activities associated with, and involving, the one or more individual or joint investment accounts) during a future temporal interval, e.g., the target interval $\Delta t_{target}$ described herein. In some instances, and for each of the customers, the output data may include numerical values indicative of the predicted likelihood of the occurrence of the activity-specific engagement event during the future temporal interval, with a value of zero indicating a minimum likelihood, and value of unity indicating a maximum likelihood.

Figure 2A:
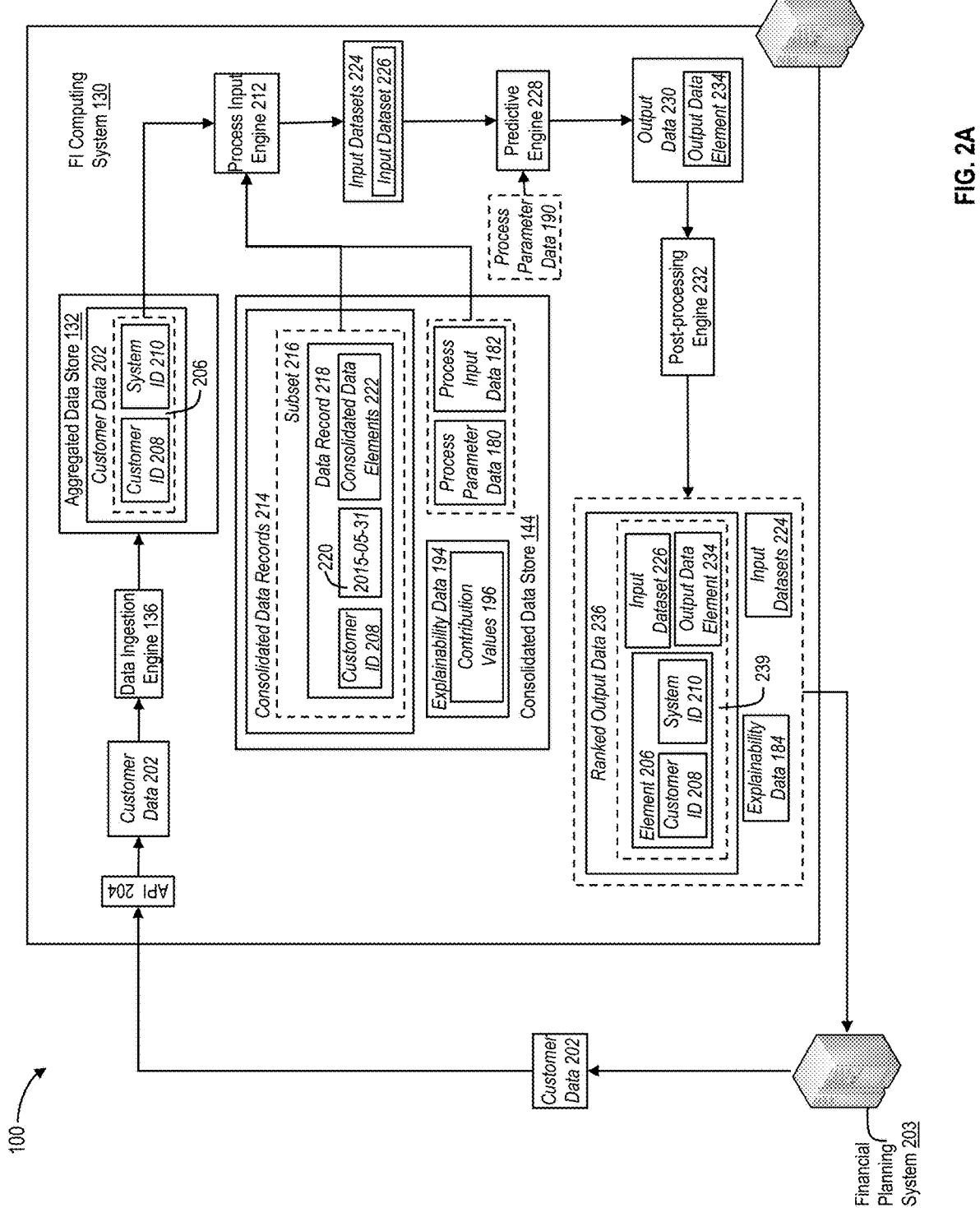
FIGS. 2A and 2B are block diagrams illustrating additional portions of the exemplary computing environment, in accordance with some exemplary embodiments.

Referring to FIG. 2A, aggregated data store 132 of FI computing system 130 may maintain one or more elements of customer data 202. In some instances, each of the one or more elements of customer data 202 may be associated with a customer of the financial institution that holds one or more investment account available to support trading activities initiated via a corresponding digital portal. FI computing system 130 may, for example, receive all, or a selected portion, of customer data 202 from a product system 203 associated with that financial institution that manages and facilitates the trading activity involving the customers and the individual or joint investment accounts, and that provisions the digital platform to devices operable by customers of the financial institution. In some instances, product system 203 may represent a computing system that includes one or more servers and tangible, non-transitory memories storing executable code and application modules. Further, the one or more servers may each include one or more processors (such as a central processing unit (CPU)), which may be configured to execute portions of the stored code or application modules to perform operations consistent with the disclosed embodiments. Product system 203 may also include a communications interface, such as one or more wireless transceivers, coupled to the one or more processors for accommodating wired or wireless internet communication with other computing systems and devices operating within environment 100. In some instances, product system 203 may be incorporated into a discrete computing system, although in other instances, product system 203 may correspond to a distributed computing system having a plurality of interconnected, computing components distributed across an appropriate computing network, such as communications network 120 of FIG. 1A, or to a publicly accessible, distributed or cloud-based computing cluster, such as a computing cluster maintained by Microsoft Azure™, Amazon Web Services™, Google Cloud™, or another third-party provider.

Referring back to FIG. 2A, an application program executed by the one or more processors of product system 203 may transmit portions of customer data 202 across communications network 120 to FI computing system 130 in accordance with a predetermined temporal schedule, e.g., at a predetermined time on a monthly or a daily basis. The transmitted portions may be encrypted using a corresponding encryption key, such as a public cryptographic key associated with FI computing system 130, and a programmatic interface established and maintained by FI computing system 130, such as application programming interface (API) 204, may receive the portions of customer data 202 from product system 203.

API 204 may, for example, route each of the elements of customer data 202 to executed data ingestion engine 136, which may perform operations that store the elements of customer data 202 within one or more tangible, non-transitory memories of FI computing system 130, such as within aggregated data store 132. In some instances, and as described herein, the received elements of customer data 202 may be encrypted, and executed data ingestion engine 136 may perform operations that decrypt each of the encrypted elements of customer data 202 using a corresponding decryption key (e.g., a private cryptographic key associated with FI computing system 130) prior to storage within aggregated data store 132. Further, although not illustrated in FIG. 2A, aggregated data store 132 may also store one or more additional elements of customer data identifying customers of the financial institution associated with trading activity involving the one or more individual or joint investment accounts, and executed data ingestion engine 136 may perform one or more synchronization operation that merge the received elements of customer data 202 with the previously stored elements of customer data, and that eliminate any duplicate elements existing among the received elements of customer data 202 with the previously stored elements of customer data (e.g., through an invocation of an appropriate Java-based SQL "merge" command).

As described herein, each of the elements of customer data 202 may be associated with, and include a unique identifier of, a customer of the financial institution associated with trading activity involving the one or more individual or joint investment accounts, and FI computing system 130 may receive each of the elements of customer data 202 from product system 203. For example, as illustrated in FIG. 2A, element 206 of customer data 202, which may be associated with a particular one of the customers and received from product system 203, may include a customer identifier 208 assigned to the particular customer by FI computing system 130 (e.g., an alphanumeric character string, etc.), and a system identifier 210 associated with product system 203 (e.g., an Internet Protocol (IP) address, a media access control (MAC) address, etc.).

Further, FI computing system 130 may also perform any of the exemplary processes described herein to generate an input dataset associated with each of the customers identified by the discrete elements of customer data 202, and to apply the adaptively trained, machine-learning or artificial-intelligence process (e.g., the gradient-boosted, decision-tree process described herein) to each of the input datasets, in accordance with a predetermined temporal schedule (e.g., on a monthly basis at a predetermined time), or in response to a detection of a triggering event. By way of example, and without limitation, the triggering event may correspond to a detected change in a composition of the elements of customer data 202 maintained within aggregated data store (e.g., to an ingestion of additional elements of customer data 202, etc.) or to a receipt of an explicit request received from product system 203.

In some instances, and in accordance with the predetermined temporal schedule, or upon detection of the triggering event, a process input engine 212 executed by FI computing system 130 may perform operations that access the elements of customer data 202 maintained within aggregated data store 132, and that obtain the customer identifier maintained within a corresponding one of the accessed elements of customer data 202. For example, as illustrated in FIG. 2A, executed process input engine 212 may access element 206 of customer data 202 (e.g., as maintained within aggregated data store 132) and obtain customer identifier 208, which includes, but is not limited to, the alphanumeric character string assigned to the particular customer of the financial institution.

Executed process input engine 212 may also access consolidated data store 144, and perform operations that identify, within consolidated data records 214, a subset 216 of consolidated data records that include customer identifier 208 and as such, are associated with the particular customer of the financial institution identified by element 206 of customer data 202. As described herein, each of consolidated data records 214 may be associated with a customer of the financial institution, and may characterize that customer, the interaction of and engagement of that customer with the financial institution, and any associated activity-specific engagement events involving that customer during a corresponding temporal interval (e.g., a cessation, by the customer, of the trading activities associated with, and involving, the one or more individual or joint investment accounts). For example, and as described herein, each of consolidated data records 214 may include a corresponding customer identifier (e.g., an alphanumeric character string assigned to a corresponding customer), a corresponding temporal identifier (e.g., that identifies the corresponding temporal interval), and one or more consolidated data elements and elements of grouping data associated with the corresponding customer. Examples of these consolidated data elements may include, but are not limited to, elements of profile, account, transaction, trading activity, engagement, and cessation data, which may be ingested, processed, aggregated, or filtered by FI computing system 130 using any of the exemplary processes described herein.

In some instances, and as illustrated in FIG. 2A, each of subset 216 may include customer identifier 208 and as such, may be associated with the particular customer identified by element 206 of customer data 202. Each of subset 216 of consolidated data records 214 may also include a temporal identifier of a corresponding temporal interval, and one or more consolidated elements associated with the particular customer, the interaction of and engagement of the particular customer with the financial institution, with the individual or joint investment accounts, the digital portal, and any associated activity-specific engagement events (e.g., the a cessation of the trading activities associated with, and involving, the one or more individual or joint investment accounts) involving the particular customer during corresponding ones of the temporal intervals. By way of example, data record 218 of subset 216 may include customer identifier 208, a corresponding temporal identifier 220 (e.g., "2022-03-31," indicating a temporal interval spanning May 1, 2021, through Mar. 31, 2022), and consolidated data elements 222, which identify and characterize the particular customer during the temporal interval spanning May 1, 2021, through Mar. 31, 2022. Further, although not illustrated in FIG. 2A, each additional, or alternate, data records within subset 216 may include customer identifier 208, a temporal identifier of a corresponding temporal interval, and corresponding elements of consolidated data that identify and characterize the particular customer during the corresponding temporal interval.

Executed process input engine 212 may also perform operations that obtain, from consolidated data store 144, elements of process input data 182 that characterize a composition of an input dataset for the adaptively trained, gradient-boosted, decision-tree process. In some instances, executed process input engine 212 may parse process input data 182 to obtain the composition of the input dataset, which not only identifies the elements of customer-specific data included within each input data set dataset (e.g., input feature values, as described herein), but also a specified sequence or position of these input feature values within the input dataset. Examples of these input feature values include, but are not limited to, one or more of the candidate feature values extracted, obtained, computed, determined, or derived by executed training input module 166 and packaged into corresponding portions of training datasets 170, as described herein. For example, and as described herein, the computed, determined, or derived feature values may include, but are not limited to, a number of interactions with a digital portal, a total number of accounts, a total number of transactions across accounts, etc., over a prior temporal interval.

In some instances, and based on the parsed portions of process input data 192, executed process input engine 212 may that identify, and obtain or extract, one or more of the input feature values from one or more of data records maintained within subset 216 of consolidated data records 214 and associated with temporal intervals disposed within the extraction interval $\Delta t_{extract}$, as described herein. Executed process input engine 212 may perform operations that package the obtained, or extracted, input feature values within a corresponding one of input datasets 224, such as input dataset 226 associated with the particular customer identified by element 206 of customer data 202, in accordance with their respective, specified sequences or positions. Further, in some examples, and based on the parsed portions of process input data 192, executed process input engine 212 may perform operations that compute, determine, or derive one or more of the input features values based on elements of data extracted or obtained from the additional ones of the consolidated data records, as described herein. Executed process input engine 212 may perform operations that package each of the computed, determined, or derived input feature values into portions of input datasets 224 in accordance with their respective, specified sequences or positions.

Through an implementation of these exemplary processes, executed process input engine 212 may populate an input dataset associated with the particular customer identified by element 206 of customer data 202, such as input dataset 226 of input datasets 224, with input feature values obtained or extracted from, or computed, determined or derived from element of data within, the data records of subset 216. Further, in some instances, executed process input engine 212 may also perform any of the exemplary processes described herein to generate, and populate with input feature values, an additional one of input datasets 224 for each of the additional, or alternate, customers of the financial institution associated with additional, or alternate, elements of customer data 202. Executed process input engine 212 may package each of the discrete, customer-specific input datasets within input datasets 224, and executed process input engine 212 may provide input datasets 224 as an input to a predictive engine 228 executed by the one or more processors of FI computing system 130.

As illustrated in FIG. 2A, executed predictive engine 228 may perform operations that obtain, from consolidated data store 144, process parameter data 190 that includes one or more model parameters of the adaptively trained, machine-learning or artificial-intelligence process, e.g., the trained, gradient-boosted, decision-tree process described herein. For example, and as described herein, the model parameters included within process parameter data 190 may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters).

In some instances, executed predictive engine 228 may perform operations that apply the trained, machine-learning or artificial-intelligence process to input datasets of input datasets 224, including input dataset 226, and that generate an element of output data 230 associated with a corresponding one of input datasets 224, and as such, a corresponding one of the customers identified by the elements of customer data 202. By way of example, and based on portions of process parameter data 190, executed predictive engine 228 may perform operations that establish a plurality of nodes and a plurality of decision trees for the adaptively trained, gradient-boosted, decision-tree process, each of which receive, as inputs (e.g., "ingest"), corresponding elements of input datasets 224. Further, and based on the execution of predictive engine 228, and on the ingestion of input datasets 224 by the established nodes and decision trees of the adaptively trained, gradient-boosted, decision-tree process, FI computing system 130 may perform operations that apply the adaptively trained, gradient-boosted, decision-tree process to each of the input datasets of input datasets 224, including input dataset 226, and that generate an element of output data 230 associated with a corresponding one of input datasets 224, and as such, a corresponding one of the customers identified by the elements of customer data 202.

As described herein, each of the generated elements of output data 230 may include a numerical score indicative of a predicted likelihood that the corresponding one of the customers will be involved in occurrence of an activity-specific engagement event (e.g., a customer-specific cessation of the trading activities associated with, and involving, the one or more individual or joint investment accounts provisioned by the financial institution cessation) during the future temporal interval, e.g., the target interval $\Delta t_{target}$, described herein. In some examples, the numerical score within each of the elements of output data 230 may range from zero to unity, with zero being indicative of a minimal predicted likelihood, and unity being indicative of a maximum predicted likelihood.

As illustrated in FIG. 2A, executed predictive engine 228 may provide the generated elements of output data 230 (e.g., either alone, or in conjunction with corresponding ones of input datasets 224) as an input to a post-processing engine 232 executed by the one or more processors of FI computing system 130. In some instances, and upon receipt of the generated elements of output data 230 (e.g., and additionally, or alternatively, the corresponding ones of input datasets 224), executed post-processing engine 232 may perform operations that access the elements of customer data 202 maintained within consolidated data store 144, and associate each of the elements of customer data 202 (e.g., that identify a corresponding one of the customers of the financial institution that hold an unsecured credit product) with a corresponding one of the elements of output data 230 (e.g., that include numerical scores indicative of the predicted likelihood that corresponding ones of the customers will be involved in the activity-specific cessation event during the future temporal interval), and to a corresponding one of input datasets 224 (which include the feature values).

By way of example, element 234 of output data 230 may be associated with the particular customer identified by element 206 of customer data 202, and executed post-processing engine 232 may, in some instances, associate element 206 of customer data 202 with element 234 of output data 230 and with input dataset 226 of input datasets 224. Executed post-processing engine 232 may perform any of these exemplary processes to associate each additional, or alternate, one of the elements of output data 230 with a corresponding one of the elements of customer data 202 and a corresponding one of input datasets 224. Further, and in some instances, executed post-processing engine 232 may perform operations that rank the associated elements of customer data 202, elements of output data 230, and input datasets 224 based on magnitudes of the corresponding numerical scores (e.g., which indicate the predicted likelihood that corresponding ones of the customer will be involved in the activity-specific cessation events during the future temporal interval), and output elements of processed output data 236 that include the associated, and now elements of customer data 202, elements of output data 230, and input datasets 224.

In some instances, by ranking the associated elements of customer data 202, elements of output data 230, and input datasets 224 in accordance with the respective numerical scores, FI computing system 130 may identify those customers of the financial institution that represent the greatest risk of ceasing trading activities during the future temporal interval. For example, and for a particular customer of the financial institution, processed output data 236 may include a corresponding ranked element 239 that associates together element 206 of customer data 202 (which includes customer identifier 208 of the particular customer) and element 234 of output data 230 that specifies a numerical score of 0.88 for the particular customer, e.g., a 88% likelihood that the particular customer will cease trading activities during the future temporal interval.

Executed post-processing engine 232 may also perform operations that obtain one or more elements of explainability data 194 associated with the adaptively trained, machine-learning or artificial-intelligence process, including contribution values 196, from a corresponding portion of consolidated data store 144. As described herein, the one or more elements of explainability data 194 may, among other things, characterize a contribution of each of the discrete feature values specified within process input data 192 to the predicted likelihood of the occurrences of the activity-specific attrition engagement events involving the customers of the financial institution (e.g., a cessation, by the customers, of the trading activities associated with, and involving, the one or more individual or joint investment accounts provisioned by the financial institution) during the target interval $\Delta t_{target}$. For example, each of contribution values 196 may be indicative of a relative contribution and importance of each of the discrete features to the predicted likelihoods of the occurrences of the activity-specific engagement events based on a determined number of branching points that utilize the corresponding feature, and FI computing system 130 may perform any of the exemplary processes described herein to compute each of contribution values 196 based on a computed Shapley feature value for the corresponding feature, or based on any additional or alternate, metric indicative of the contribution of the corresponding feature to the predicted likelihoods of the occurrences of the service-specific attrition events As illustrated in FIG. 2A, FI computing system 130 may perform operations that transmit all, or a selected portion of, ranked output data 236, the one or more elements of explainability data 194, and in some instances, input datasets 224 across network 120 to product system 203, e.g., based on system identifier 210. Further, although not illustrated in FIG. 2A or 2B, FI computing system 130 may also encrypt all, or a selected portion of, ranked output data 236 and/or the elements of explainability data 194 prior to transmission across communications network 120 using a corresponding encryption key, such as, but not limited to, a corresponding public cryptographic key associated with product system 203.

In some examples, product system 203 may receive processed output data 236, which includes the customer-specific sets of linked elements of customer data, output data elements, and input datasets, and the elements of explainability data 194, from FI computing system 130. In some instances, processed output data 236 may be encrypted, and product system 203 may decrypt portions of processed output data 236 with a corresponding decryption key, e.g., a private cryptographic key associated with product system 203. In some examples, product system 203 may accessed each of the customer-specific sets of linked elements of customer data, output data elements, and input datasets maintained within processed output data 236, and may perform operations that engage, proactively, one or more of the customers in an attempt to prevent the predicted future, activity-specific cessation events before detection by representatives of the financial institution. For example, product system 203 may perform operations that generate, either alone or based on input from representatives of the financial institution, customer-specific marketing or remediation strategies based on a predicted propensity of each of the customers cease trading activities, or to cease interactions with the digital portal, during the future temporal interval, e.g., as specified by the numerical values within the customer-specific elements of processed output data 236.

For example, and based on processed output data 236, product system 203 may perform operations that identify a first subset of the customer-specific sets of linked elements of customer data, output data elements, and input datasets associated with numerical scores that exceed a first threshold value, and may characterize the customers associated with the first subset as posing a high risk of cessation. Further, product system 203 may also perform operations that identify a second subset of the customer-specific sets of linked elements of customer data, output data elements, and input datasets associated with numerical scores that fall between the first threshold value and a second threshold value (smaller in magnitude than the first threshold value), and may characterize the customers associated with the second subset as posing a medium risk of cessation. Additionally, the product system 203 may perform operations that identify a third subset of the customer-specific sets of linked elements of customer data, output data elements, and input datasets associated with numerical scores that fall between the second threshold value and zero, and may characterize the customers associated with the third subset as posing a low risk of cessation. In some instances, the product system 203 may tailor marketing strategies to each customer based the assigned level of cessation risk (e.g., low, medium, or high), and may apply these customer-specific marketing strategies to each of the customers in an effort to reduce, or mitigate, the risk of cessation posed by each of the customers.

Figure 2B:
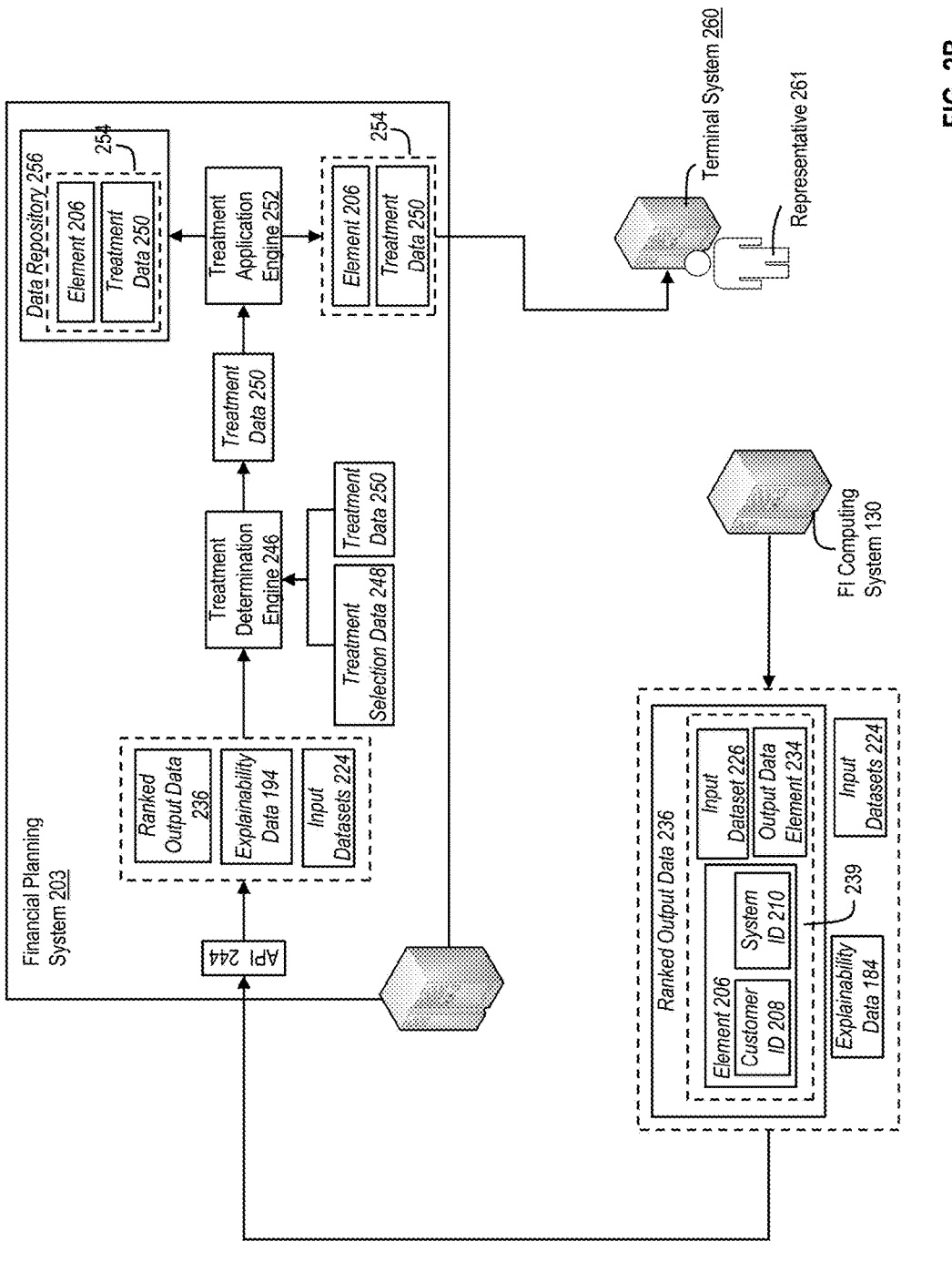

Referring to FIG. 2B, a programmatic interface established and maintained by the product system 203, such as application programming interface (API) 244, may receive the elements of ranked output data 236, the elements of explainability data 194, and input datasets 224, and may route the elements of ranked output data 236, and in some instances, the elements of explainability data 194 and input datasets 224, to a treatment determination engine 246 executed by the one or more processors of product system 203. In some instances, not illustrated in FIG. 2B, FI computing system 130 may also encrypt all, or a selected portion of, the elements of ranked output data 236, explainability data 194, and input datasets 224 prior to transmission across communications network 120 using a corresponding, encryption key (e.g., a public cryptographic key associated with product system 203), and executed treatment determination engine 246 may perform operations that decrypt the encrypted elements of ranked output data 236, explainability data 194, and/or input datasets 224 using a corresponding decryption key (e.g., a private cryptographic key associated with product system 203).

In some instances, executed treatment determination engine 246 may perform operations that parse the elements of ranked output data 236 (including element 239) and obtain, from each of the elements of ranked output data 236, a customer identifier associated with a corresponding one of the customers of the financial institution and a numerical value indicative of a likelihood of an occurrence of an activity-specific engagement event involving the corresponding customer during a future temporal interval (e.g., a cessation, by the corresponding customer, of the trading activities associated with, and involving, the one or more individual or joint investment accounts provisioned by the financial institution). By way of example, executed treatment determination engine 246 may determine that element 239 of ranked output data 236 that includes, among other things, element 206 of customer data 202, which includes customer identifier 208 of the particular customer of the financial institution, output data element 234, which specifies a numerical score of 0.88 for the particular customer. As described herein, the numerical score of a numerical score of 0.88 may indicate 88% likelihood that the particular customer will cease trading activities during the future temporal interval.

Further, and based on the obtained numerical scores, executed treatment determination engine 246 may perform any of the exemplary processes described herein to assess the likelihood that each of the customers will cease the trading activities associated with the one or more individual or joint investment accounts during the future temporal interval, and further, to identify one or more remediation processes or treatments that are applicable to the corresponding ones of the customers and appropriate to the assessed likelihoods. Through an application of the identified remediation processes or treatments to the corresponding ones of the customers, certain of the exemplary processes described herein may enable product system 203 to mitigate the likelihood that at least a portion of these customers will cease trading activities involving the one or more individual or joint investment accounts during the future temporal interval.

In some instances, executed treatment determination engine 246 may obtain, from one or more tangible, non-transitory memories, elements of treatment selection data 248 that specify predetermined, or dynamically determined, ranges of the numerical scores establishing respective groups of characterized characterize by, among other things, a minimal likelihood that the customers will cease the trading activities during the future temporal interval (e.g., a numerical score below a first threshold score, such as 0.4), a moderate, but emerging, likelihood that the customers will cease the trading activities during the future temporal interval (e.g., a numerical score bracketed between the first threshold score, such as 0.4, and second threshold score, such as 0.7), and an elevated likelihood that the customers will cease the trading activities during the future temporal interval (e.g., a numerical score in excess of the second threshold score, such as 0.7). Further, for each of the groups and corresponding assessed likelihood, the elements of treatment selection data 248 may also identify one or more treatment processes appropriate to the customers and the assessed likelihood that these customers will cease the trading activities during the future temporal interval By way of example, for customers characterized by a minimal likelihood of a cessation of trading activities during the future temporal interval (e.g., a numerical score below a first threshold score, such as 0.4), elements of treatment selection data 248 may specify that product system 203 should provision, to these customers, elements of content highlighting a performance of their individual or joint accounts at the financial institution and additional opportunities to expand their exposure for investment products available for provisioning by the financial institution.

Further, for customer characterized by the moderate, but emerging, likelihood of the cessation of trading activities during the future temporal interval (e.g., a numerical score bracketed between the first threshold score, such as 0.4, and second threshold score, such as 0.7), elements of treatment selection data 248 may specify that product system 203 should provision, to these customers, elements of content highlighting additional investment products available for provisioning by the financial institution, and identifying mechanisms to improve a yield of the individual or joint investment accounts associated with these customers. Additionally, for customers characterized by the elevated likelihood of the cessation of trading activities during the future temporal interval (e.g., a numerical score in excess of the second threshold score, such as 0.7), the elements of treatment selection data 248 may specify treatments that include, but are not limited to, supplying offers including incentives to maintain their trading activities at the financial institution, such as a provisioning of cash-based or loyalty-based rewards with the financial institution, or a discount on brokerage fees paid by these customers. The content may, for instance, be provisioned to the customers through physical or electronic correspondence (e.g., a physical letter, an email, a text-message, or an in-app notification, etc.), or through voice-based communications (e.g., via a pre-recorded message delivered by telephone, via a call manually generated by a representative of the financial institution).

Through an application of one or more of these treatments to a corresponding customer of the financial institution, product system 203 may maintain or reduce a likelihood of the corresponding customer will cease the trading activities during the future temporal interval. For example, as illustrated in FIG. 2B, executed treatment determination engine 246 may receive elements 239 of ranked output data 236, which includes element 206 of customer data that specifies customer identifier 208 and element 234 of output data 230 that specifies a numerical score of 0.88 for the particular customer (e.g., a 88% likelihood that the particular customer will cease trading activities during the future temporal interval). Based on the numerical score, executed treatment determination engine 246 may determine that the customer associated with customer associated with customer identifier 208 is associated with an elevated likelihood of a cessation of trading activities during the future temporal interval, and may obtain, from the one or more tangible, non-transitory memories, elements of treatment data 250 that identify and characterize one or more treatment appropriate to the element likelihood of the cessation of trading activities during the future temporal interval. As described herein, the elements of treatment data 250 may include elements of digital content associated with corresponding cash-based or loyalty-based rewards for the customer associated with customer identifier 208, such as a discount on brokerage fees, and executed treatment determination engine 246 may provide the elements of treatment data 250, and element 206, to a treatment application engine 252 executed by the one or more processors of product system 203.

Executed treatment application engine 252 may, for example, receive element 206, which includes customer identifier 208, and treatment data 250, and may perform any of the exemplary processes described herein to apply the one or more appropriate treatments to the particular customer associated with customer identifier 208. In some instances, executed treatment application engine 252 may store element 206 and treatment data 250 within a corresponding portion of a tangible, non-transitory memory of product system 203, e.g., as data record 254 of data repository 256. Additionally, or alternatively, executed treatment application engine 252 may perform operations that cause product system 203 to transmit data record 254, which includes element 206 and treatment data 250, across communications network 120 to a terminal system 260 operated by a representative 261 the financial institution. As illustrated in FIG. 2B, terminal system 260 may perform operations (e.g., via execution of stored software instructions by one or more corresponding processors) that store the customer identifier and treatment data 250 within a portion of one or more tangible, non-transitory memories, and that enable representative 261 to present the one or more treatments for the particular customer, e.g., via voice-based or digital channels of communications.

Further, in some examples, executed treatment determination engine 246 of product system 203 may perform operations that analyze each of contribution values 196 maintained within explainability data 194, and the feature values maintained within each of customer-specific input datasets 224 (e.g., as maintained within corresponding elements of ranked output data 236), and establish one or more cessation personas associated with underlying rationales or reasons that cause corresponding groups of customers to cease trading activities associated with corresponding ones of the individual or joint investment accounts. As described herein, and for each of the customers characterized by the customer-specific elements of ranked output data 236, feature contribution values 196 may characterize an importance of corresponding ones of the input features to the predicted likelihood of an occurrence of the activity-specific engagement events during the future temporal interval, e.g., a cessation, by corresponding ones of the customers, of trading activities associated with, and involving, the one or more individual or joint investment accounts provisioned by the financial institution For instance, executed treatment determination engine 246 may perform operations that identify a subset of the features that are associated with a maximum contribution to the predicted likelihood of an occurrence of the service-specific attrition events during the future temporal interval (e.g., a predetermined number of input features, such as four, associated with the largest contribution values of contribution values 196) or that exceed a predetermined, threshold contribution value.

Based on the feature values maintained within customer-specific ones of input datasets 224, executed treatment determination engine 246 may perform operations that segment the customers associated with corresponding elements of ranked output data 236 into corresponding groups associated with corresponding likelihoods of involvement in future activity-specific engagement events, such as, but not limited to, the low, medium, and high risks of involvement in the future occurrences of the service-specific attrition events described herein. By way of example, each of the features within the input datasets may be associated with a corresponding feature identifier, and each of the unique feature identifiers and corresponding ones of the feature contributions may establish variable pairs for associated with the predicted occurrences of service-specific attrition events. In some instances, product system 203 may perform operations that apply an additional, trained machine-learning or artificial-intelligence process, such as a trained clustering process (e.g., a trained k-means process), to the variable pairs associated with the subset of the features, the customer-specific values of the feature subset maintained within corresponding ones of input datasets 224, and corresponding elements of ranked output data 236.

Further, and based on the application of the trained clustering process (e.g., the trained k-means process) to the variable pairs, the customer-specific values of the feature subset, and corresponding elements of ranked output data 236, product system 203 may generate elements of clustering data that identify, and characterize, corresponding clusters of the customers that exhibit the corresponding likelihoods of involvement in future activity-specific engagement events, such as, but not limited to, the low, moderate, and elevated likelihoods that the customers will cease trading activities associated with, and involving, the one or more individual or joint investment accounts provisioned by the financial institution during the future temporal interval. The identified clusters may, for examples, establish corresponding distinct, or overlapping attrition personas, and the attrition personas may inform an approach taken by product system 203, or by one or more representatives of the financial institution, to proactively engage the customers in an attempt to prevent the predicted future attrition events.

FIG. 3 is a flowchart of an exemplary process 300 for adaptively training a machine learning or artificial intelligence process to predict a likelihood of an occurrence of an activity-specific engagement event involving a customer during a future temporal interval using training datasets associated with a first prior temporal interval, and using validation datasets associated with a second, and distinct, prior temporal interval. As described herein, the occurrence of the activity-specific engagement event may correspond to a cessation, by the customer, of the trading activities associated with, and involving, the one or more individual or joint investment accounts provisioned by the financial institution (e.g., a transition in the customer's trading habits from active to inactive), and in some instances, the cessation in the trading activities may be associated with, and may be indicated by, a corresponding cessation of engagement with a digital portal associated with the trading activities.

As described herein, the machine-learning or artificial-intelligence process may include an ensemble or decision-tree process, such as a gradient-boosted decision-tree process (e.g., the XGBoost model), and the training and validation datasets may include, but are not limited to, values of adaptively selected features obtained, extracted, or derived from the filtered data records maintained within consolidated data store 144, e.g., from data elements maintained within the discrete data records of filtered data records 164 or the additional filtered data records 164. In some instances, one or more computing systems, such as, but not limited to, one or more of the distributed components of FI computing system 130, may perform one or of the steps of exemplary process 300, as described herein.

Referring to FIG. 3, FI computing system 130 may perform any of the exemplary processes described herein to establish a secure, programmatic channel of communication with one or more source computing systems, such as source systems 110 of FIG. 1A, and to obtain, from the source computing systems, elements of internal and external interaction data that identify and characterize one or more customers of the financial institution (e.g., in step 302 of FIG. 3). The elements of internal customer data may include, but are not limited to, one or more elements of profile, account, transaction, trading activity, engagement, cessation, and reporting and market data associated with corresponding ones of the customers. FI computing system 130 may also perform operations that store (or ingest) the obtained elements of internal customer data within one or more accessible data repositories, such as aggregated data store 132 (e.g., also in step 302 of FIG. 3). In some instances, FI computing system 130 may perform the exemplary processes described herein to obtain and ingest the elements of elements of internal customer data in accordance with a predetermined temporal schedule (e.g., on a daily basis, a monthly basis, etc.), or a continuous streaming basis, across the secure, programmatic channel of communication.

Further, FI computing system 130 may access the ingested elements of internal and external interaction data, and may perform any of the exemplary processes described herein to pre-process the ingested elements of internal and external interaction data elements (e.g., profile, account, transaction, trading activity, engagement, cessation, and reporting and market data) and generate one or more consolidated data records (e.g., in step 304 of FIG. 3). As described herein, the FI computing system 130 may store each of the consolidated data records within one or more accessible data repositories, such as consolidated data store 144 (e.g., also in step 304 of FIG. 3).

FI computing system 130 may also perform any of the exemplary processes described herein to identify one or more individual or joint investment accounts (e.g., as identified by elements of the ingested account data) that are capable of supporting trading activity initiated by each, or a subset, of the customers of the financial institution identified and characterized by the elements of ingested profile data (e.g., in step 306 of FIG. 3). By way of example, and based on an application of one or more graph-theory or clustering processes to the elements of the ingested elements of account data, FI computing system 130 may perform operations, described herein, to identify, for at least a subset of the customers, groups of connected components in a mapping of corresponding pairs of party and account identifiers that represent the one or more individual or joint investment accounts available to each of the subset of customers and to generate elements of linked-account data that include the account identifiers for the individual or joint investment accounts available to corresponding ones of the customers. FI computing system 130 may also perform operations that modify one or more of the consolidated data records to include a corresponding element of linked-account data (e.g., also in step 306 of FIG. 3). Further, FI computing system 130 may also perform any of the exemplary processes described herein to incorporate, into one or more of the consolidated data records, additional elements of trading activity data characterizing the individual and joint investment identified within corresponding ones of the elements of linked-account data (e.g., in step 308 of FIG. 3).

In some instances, FI computing system 130 may perform any of the exemplary processes described herein to decompose the consolidated data records into (i) a first subset of the consolidated data records having temporal identifiers associated with a first prior temporal interval (e.g., the training interval $\Delta t_{training}$, as described herein) and (ii) a second subset of the consolidated data records having temporal identifiers associated with a second prior temporal interval (e.g., the validation interval $\Delta t_{validation}$, as described herein), which may be separate, distinct, and disjoint from the first prior temporal interval (e.g., in step 310 of FIG. 3). By way of example, portions of the consolidated data records within the first subset may be appropriate to train adaptively the machine-leaning or artificial process (e.g., the gradient-boosted decision model described herein during the training interval $\Delta t_{training}$ and portions of the consolidated records within the second subset may be appropriate to validating the adaptively trained gradient-boosted decision model during the validation interval $\Delta t_{validation}$. FI computing system 130 may also perform any of the exemplary processes described herein to filter the consolidated data records of the first and second subsets in accordance with one or more filtration criteria (e.g., in step 312 of FIG. 3).

In some instances, FI computing system 130 may perform any of the exemplary processes described herein to generate a plurality of training datasets based on elements of data obtained, extracted, or derived from all or a selected portion of the first subset of the consolidated data records (e.g., in step 314 of FIG. 3). By way of example, each of the plurality of training datasets may be associated with a corresponding one of the customers of the financial institution and a corresponding temporal interval, and may include, among other things a customer identifier associated with that corresponding customer and a temporal identifier representative of the corresponding temporal interval, as described herein. Further, and as described herein, each of the plurality of training datasets may also elements of data (e.g., feature values) that characterize the corresponding one of the customers, the corresponding customer's interaction with the financial institution or with financial planning services provisioned by the financial institution, and/or an occurrence (or lack thereof) of an activity-specific engagement event involving the corresponding customer during a temporal interval disposed prior to the corresponding temporal interval, e.g., during the extraction interval $\Delta t_{extract}$ described herein. Further, each of the plurality of training datasets may also include an element of ground-truth data indicative of the presence or absence of an actual activity-specific engagement event associated with a corresponding one of the customers within a corresponding target prediction interval $\Delta t_{target}$, such as, but not limited to, a three-month period disposed between one and four months of the date specified by the temporal identifier, e.g., the positive or negative targets described herein.

Based on the plurality of training datasets, FI computing system 130 may also perform any of the exemplary processes described herein to train adaptively the machine-learning or artificial-intelligence process (e.g., the gradient-boosted decision-tree process described herein) to predict, at a temporal prediction point, a likelihood of occurrences of service-specific attrition events involving customers of the financial institution during a future temporal interval (e.g., in step 316 of FIG. 3). For example, and as described herein, FI computing system 130 may perform operations that establish a plurality of nodes and a plurality of decision trees for the gradient-boosted, decision-tree process, which may ingest and process the elements of training data (e.g., the customer identifiers, the temporal identifiers, the feature values, etc.) maintained within each of the plurality of training datasets, and that adaptively train the gradient-boosted, decision-tree process against the elements of training data included within each of the plurality of the training datasets.

In some examples, the distributed components of FI computing system 130 may perform any of the exemplary processes described herein in parallel to establish the plurality of nodes and a plurality of decision trees for the gradient-boosted, decision-tree process, and to adaptively train the gradient-boosted, decision-tree process against the elements of training data included within each of the plurality of the training datasets. The parallel implementation of these exemplary adaptive training processes by the distributed components of FI computing system 130 may, in some instances, be based on an implementation, across the distributed components, of one or more of the parallelized, fault-tolerant distributed computing and analytical protocols described herein.

Through the performance of these adaptive training processes, FI computing system 130 may compute one or more candidate process parameters that characterize the adaptively trained machine-learning or artificial-intelligence process, such as, but not limited to, candidate process parameters for the adaptively trained, gradient-boosted, decision-tree process described herein (e.g., in step 318 of FIG. 3). In some instances, and for the adaptively trained, gradient-boosted, decision-tree process, the candidate process parameters included within candidate process data may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, and based on the performance of these adaptive training processes, FI computing system 130 may perform any of the exemplary processes described herein to generate candidate input data, which specifies a candidate composition of an input dataset for the adaptively trained machine-learning or artificial intelligence process, such as the adaptively trained, gradient-boosted, decision-tree process (e.g., also in step 318 of FIG. 3).

Further, FI computing system 130 may perform any of the exemplary processes described herein to access the second subset of the consolidated data records, and to generate a plurality of validation subsets having compositions consistent with the candidate input data (e.g., in step 320 of FIG. 3). As described herein, each of the plurality of the validation datasets may be associated with a corresponding one of the customers of the financial institution, and with a corresponding temporal interval within the validation interval $\Delta t_{validation}$, and may include a customer identifier associated with the corresponding one of the customers and a temporal identifier that identifies the corresponding temporal interval. Further, each of the plurality of the validation datasets may also include one or more feature values that are consistent with the candidate input data, associated with the corresponding one of the customers, and obtained, extracted, or derived from corresponding ones of the accessed second subset of the consolidated data records (e.g., during the corresponding extraction interval $\Delta t_{extract}$, as described herein). In some instances, each of the plurality of validation datasets may also include an element of ground-truth data indicative of the presence or absence of an actual service-specific attrition event associated with a corresponding one of the customers within a corresponding target prediction interval $\Delta t_{target}$, such as, but not limited to, a three-month period disposed between one and four months of the date specified by the temporal identifier, e.g., the positive and negative targets described herein.

In some instances, FI computing system 130 may perform any of the exemplary processes described herein to apply the adaptively trained machine-learning or artificial intelligence process (e.g., the adaptively trained, gradient-boosted, decision-tree process described herein) to respective ones of the validation datasets, and to generate corresponding elements of output data based on the application of the adaptively trained machine-learning or artificial intelligence process to the respective ones of the validation datasets (e.g., in step 320 of FIG. 3). As described herein, each of the generated elements of output data may be associated with a respective one of the validation datasets and as such, a corresponding one of the customers of the financial institution. Further, each of the generated elements of output data may also a numerical score (e.g., ranging from zero to unity) indicative of a predicted likelihood that the corresponding one of the customers will be involved in an activity-specific engagement event within a future temporal interval, e.g., to a cessation, by the corresponding customer, of the trading activities associated with, and involving, the one or more individual or joint investment accounts.

Further, and as described herein, the distributed components of FI computing system 130 may perform any of the exemplary processes described herein in parallel to validate the adaptively trained, gradient-boosted, decision-tree process described herein based on the application of the adaptively trained, gradient-boosted, decision-tree process (e.g., configured in accordance with the candidate process parameters) to each of the validation datasets. The parallel implementation of these exemplary adaptive validation processes by the distributed components of FI computing system 130 may, in some instances, be based on an implementation, across the distributed components, of one or more of the parallelized, fault-tolerant distributed computing and analytical protocols described herein.

In some examples, FI computing system 130 may perform any of the exemplary processes described herein to compute a value of one or more metrics that characterize a predictive capability, and an accuracy, of the adaptively trained machine-learning or artificial intelligence process (such as the adaptively trained, gradient-boosted, decision-tree process described herein) based on the generated elements of output data and corresponding ones of the validation datasets (e.g., in step 320 of FIG. 3), and to determine whether all, or a selected portion of, the computed metric values satisfy one or more threshold conditions for a deployment of the adaptively trained machine-learning or artificial intelligence process (e.g., in step 326 of FIG. 3). As described herein, and for the adaptively trained, gradient-boosted, decision-tree process, the computed metrics may include, but are not limited to, one or more recall-based values (e.g., "recall@5," "recall@10," "recall@20," etc.), one or more precision-based values for the adaptively trained, gradient-boosted, decision-tree process, and additionally, or alternatively, a computed value of an area under curve (AUC) for a precision-recall (PR) curve or a computed value of an AUC for a receiver operating characteristic (ROC) curve associated with the adaptively trained, gradient-boosted, decision-tree process.

Further, and as described herein, the threshold requirements for the adaptively trained, gradient-boosted, decision-tree process may specify one or more predetermined threshold values, such as, but not limited to, a predetermined threshold value for the computed recall-based values, a predetermined threshold value for the computed precision-based values, and/or a predetermined threshold value for the computed AUC values. In some examples, FI computing system 130 may perform any of the exemplary processes described herein to establish whether one, or more, of the computed recall-based values, the computed precision-based values, or the computed AUC values exceed, or fall below, a corresponding one of the predetermined threshold values and as such, whether the adaptively trained, gradient-boosted, decision-tree process satisfies the one or more threshold requirements for deployment.

If, for example, FI computing system 130 were to establish that one, or more, of the computed metric values fail to satisfy at least one of the threshold requirements (e.g., step 326; NO), FI computing system 130 may establish that the adaptively trained machine-learning or artificial-intelligence process (e.g., the adaptively trained, gradient-boosted, decision-tree process) is insufficiently accurate for deployment and a real-time application to the elements of profile, account, transaction, financial planning service, attrition, branch, and/or reporting and market data described herein. Exemplary process 300 may, for example, pass back to step 314, and FI computing system 130 may perform any of the exemplary processes described herein to generate additional training datasets based on the elements of the consolidated data records maintained within the first subset.

Alternatively, if FI computing system 130 were to establish that each computed metric value satisfies threshold requirements (e.g., step 326; YES), FI computing system 130 may deem the machine-learning or artificial intelligence process (e.g., the gradient-boosted, decision-tree process described herein) adaptively trained and ready for deployment and real-time application to the elements of profile, account, transaction, financial planning service, attrition, branch, and/or reporting and market data described herein. FI computing system 130 may also perform any of the exemplary processes described herein to generate one or more elements of explainability data that, among other things, characterize a contribution of each of the discrete feature values specified within process input data to the predicted likelihood of the occurrences of the service-specific attrition events involving the customers of the financial institution during the future temporal interval (e.g., in step 330 of FIG. 3). By way of example, FI computing system 130 may perform operations, described herein, that compute a contribution value indicative of a relative contribution and importance of each of the discrete features to the predicted likelihoods of the occurrences of the service-specific attrition events based on a determined number of branching points that utilize the corresponding feature, based on a computed Shapley feature value for the corresponding feature, or based on any additional or alternate, metric indicative of the contribution of the corresponding feature to the predicted likelihoods of the occurrences of the service-specific attrition events.

FI computing system 130 may perform any of the exemplary processes described herein to generate trained process data that includes the process parameter data and process input data associated with the of the adaptively trained machine-learning or artificial intelligence process (e.g., in step 328 of FIG. 3). Exemplary process 300 is then complete in step 332.

Figure 4:
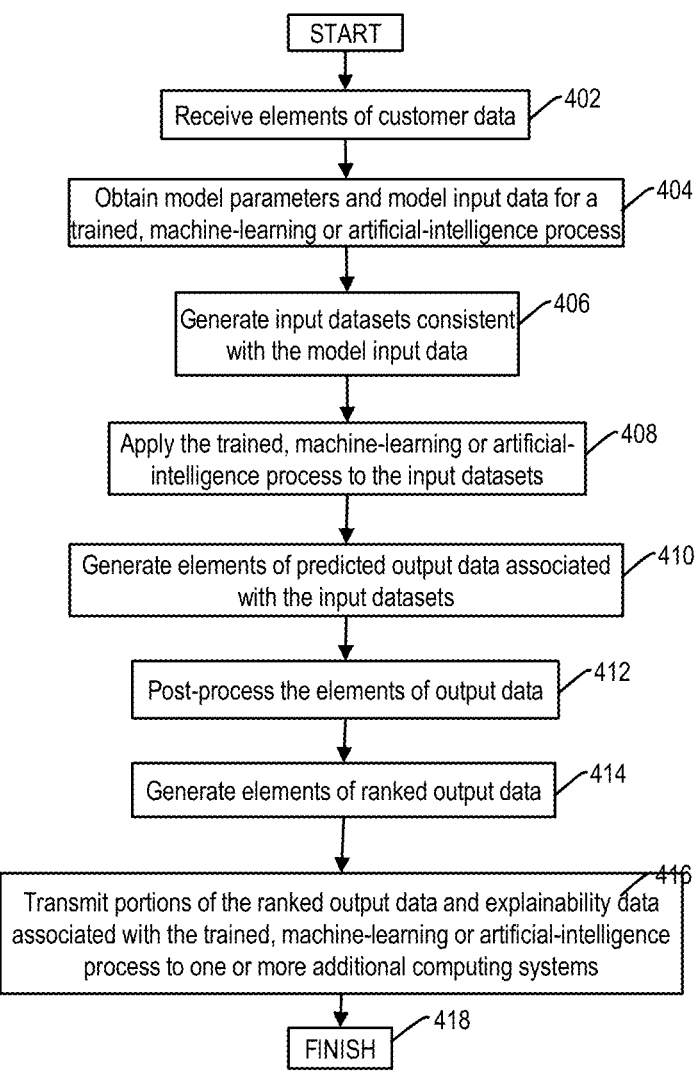
FIG. 4 is a flowchart of an exemplary process for predicting a likelihood of future occurrences of activity-specific engagement events based on an application of an trained machine-learning or artificial-intelligence process to customer-specific input datasets, in accordance with some exemplary embodiments.

FIG. 4 is a flowchart of an exemplary process 400 for predicting a likelihood of future occurrences of activity-specific engagement event involving one or more customers of a financial institution based on an application of an adaptively trained machine-learning or artificial-intelligence process to customer-specific input datasets, in accordance with the disclosed exemplary embodiments. As described herein, the occurrence of the activity-specific engagement event may correspond to a cessation, by the customer, of the trading activities associated with, and involving, the one or more individual or joint investment accounts provisioned by the financial institution (e.g., a transition in the customer's trading habits from active to inactive), and in some instances, the cessation in the trading activities may be associated with, and may be indicated by, a corresponding cessation of engagement with a digital portal associated with the trading activities.

Further, the machine-learning or artificial-intelligence process may include an ensemble or decision-tree process, such as a gradient-boosted decision-tree process (e.g., the XGBoost model), which may be trained adaptively to predict a likelihood of an occurrence of an activity-specific cessation event during a future temporal interval using training datasets associated with a first prior temporal interval (e.g., the training interval $\Delta t_{training}$, as described herein), and using validation datasets associated with a second, and distinct, prior temporal interval (e.g., the validation interval $\Delta t_{validation}$, as described herein). In some instances, one or more computing systems, such as, but not limited to, one or more of the distributed components of FI computing system 130, may perform one or of the steps of exemplary process 400, as described herein.

Referring to FIG. 4, FI computing system 130 may perform any of the exemplary processes described herein to receive elements of customer data that identify one or more customers of the financial institution that hold investment accounts available to support training activity (e.g., in step 402 of FIG. 4). For example, FI computing system 130 may receive the elements of customer data from one or more additional computing systems associated with, or operated by, the financial institution (such as, but not limited to, one or more of product system 203), and in some instances, FI computing system 130 may perform any of the exemplary processes described herein to store the obtained elements of customer data within a locally accessible data repository (e.g., within aggregated data store 132). Further, in some instances, FI computing system 130 may also perform any of the exemplary processes described herein to synchronize and merge the obtained elements of customer data with one or more previously ingested elements of customer data maintained within the locally accessible data repository. As described herein, each of the elements of customer data may be associated with a corresponding one of the customers, and may include a customer identifier associated with the corresponding one of the customers (e.g., the alphanumeric character string, etc.) and a system identifier associated with a corresponding one of the additional computing systems (e.g., an IP or MAC address of product system 203, etc.).

FI computing system 130 may perform any of the exemplary processes described herein to generate an input dataset associated with each of the customers identified by the discrete elements of customer data 202, and to apply the adaptively trained, gradient-boosted, decision-tree process described herein to each of the input datasets, in accordance with a predetermined temporal schedule (e.g., on a daily basis, a monthly basis, etc.), or in response to a detection of a triggering event. By way of example, and without limitation, the triggering event may correspond to a detected change in a composition of the elements of customer data 202 maintained within aggregated data store (e.g., to an ingestion of additional elements of customer data 202, etc.) or to a receipt of an explicit request received from product system 203).

For example, FI computing system 130 may also perform any of the exemplary processes described herein to obtain one or more model parameters that characterize the adaptively trained machine-learning or artificial-intelligence process (e.g., the adaptively trained, gradient-boosted, decision-tree process described herein) and elements of model input data that specify a composition of an input dataset for the adaptively trained machine-learning or artificial-intelligence process (e.g., in step 404 of FIG. 4). In some instances, and for the adaptively trained, gradient-boosted, decision-tree process described herein, the one or more model parameters may include, but are not limited to, a learning rate associated with the adaptively trained, gradient-boosted, decision-tree process, a number of discrete decision trees included within the adaptively trained, gradient-boosted, decision-tree process (e.g., the "n_estimator" for the adaptively trained, gradient-boosted, decision-tree process), a tree depth characterizing a depth of each of the discrete decision trees included within the adaptively trained, gradient-boosted, decision-tree process, a minimum number of observations in terminal nodes of the decision trees, and/or values of one or more hyperparameters that reduce potential model overfitting (e.g., regularization of pseudo-regularization hyperparameters). Further, the elements of model input data may specify the composition of the input dataset for the adaptively trained, gradient-boosted, decision-tree process, which not only identifies the elements of customer-specific data included within each input data set dataset (e.g., input feature values, as described herein), but also a specified sequence or position of these input feature values within the input dataset.

In some instances, FI computing system 130 may access the elements of customer data associated with one or more customers of the financial institution, and may perform any of the exemplary processes described herein to generate, for the one or more customers, an input dataset having a composition consistent with the elements of model input data (e.g., in step 406 of FIG. 4). Further, and based on the one or more obtained model parameters, FI computing system 130 may perform any of the exemplary processes described herein to apply the adaptively trained machine-learning or artificial-intelligence process (e.g., the adaptively trained, gradient-boosted, decision-tree process described herein) to each of the generated, customer-specific input datasets (e.g., in step 408 of FIG. 4), and to generate a customer-specific element of predicted output data associated with each of the customer-specific input datasets (e.g., in step 410 of FIG. 4).

For example, and based on the one or more obtained model parameters, FI computing system 130 may perform operations, described herein, that establish a plurality of nodes and a plurality of decision trees for the adaptively trained, gradient-boosted, decision-tree process, each of which receive, as inputs (e.g., "ingest"), corresponding elements of the customer-specific input datasets. Based on the ingestion of the input datasets by the established nodes and decision trees of the adaptively trained, gradient-boosted, decision-tree process, FI computing system 130 may perform operations that apply the adaptively trained, gradient-boosted, decision-tree process to each of the customer-specific input datasets and that generate the customer-specific elements of the output data associated with the customer-specific input datasets.

As described herein, each of the customer-specific elements of the output data may include a numerical score indicative of a predicted likelihood that a corresponding one of the customers will be involved in an activity-specific engagement event (e.g., a cessation, by the corresponding customer, of the trading activities associated with, and involving, the one or more individual or joint investment accounts provisioned by the financial institution) during the future temporal interval. In some examples, the numerical score within each of the customer-specific elements of the output data may range from zero to unity, with zero being indicative of a minimal predicted likelihood, and unity being indicative of a maximum predicted likelihood. In step 412 of FIG. 4, FI computing system 130 may also perform any of the exemplary processes described herein to post-process the customer-specific elements of output data and, among other things, associate each of the customer-specific elements of output data with a corresponding one of the customer identifiers, and in some instances, with a corresponding one of the input datasets. Further, FI computing system 130 may also perform any of the exemplary processes to rank the associated elements of customer data, the customer-specific elements of output data, and the input datasets based on magnitudes of the corresponding numerical scores, which indicate the predicted likelihood that corresponding ones of the customers will be involved in the activity-specific cessation event during the future temporal interval, and generate elements of output data that include the associated, and now elements of customer data and the elements of customer-specific output data (e.g., in step 414 of FIG. 4).

FI computing system 130 may perform any of the exemplary processes described herein to transmit all, or a selected portion of, the elements of ranked output data elements of explainability data associated with the trained, machine-learning or artificial-intelligence process, and in some instances, the input datasets, to a corresponding one of the additional computing systems associated with the financial institution, such as product system 203 (e.g., in step 416 of FIG. 4). As described herein, the elements of explainability data may characterize a contribution of each of the discrete feature values specified within the process input data to the predicted likelihood of the occurrences of the activity-specific engagement events involving the customers of the financial institution during the future temporal interval (e.g., the cessation, by the customers, of the trading activities associated with, and involving, the one or more individual or joint investment account), and may include contribution values indicative of a relative contribution and importance of each of the discrete features to the predicted likelihoods of the occurrences of the service-specific attrition events (e.g., based on a determined number of branching points that utilize the corresponding feature, based on a computed Shapley feature value for the corresponding feature, or based on any additional or alternate, metric indicative of the contribution of the corresponding feature to the predicted likelihoods of the occurrences of the service-specific attrition events). Exemplary process 400 is then complete in step 418.

C. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including, but not limited to, application programming interfaces (APIs) 134, 204, and 244. data ingestion engine 136, pre-processing engine 140, grouping module 141, filtration engine 155, aggregation engine 157, training engine 162, training input module 166, adaptive training and validation module 172, process input engine 212, predictive engine 228, post-processing engine 232, treatment determination engine 246, and treatment application engine 252, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

What is claimed is:

1. An apparatus, comprising:
a memory storing instructions; and
at least one processor coupled to the memory, the at least one processor being configured to execute the instructions to:
    receive an identifier of a device from a computing system via the communications interface, and based on the received identifier, obtain, from the memory, elements of first interaction data associated with an activity involving the device during a first temporal interval;
    generate an input dataset based on the elements of first interaction data associated with the activity;
    based on an application of a trained artificial intelligence process to the input dataset, generate output data comprising a numerical score indicative of a predicted likelihood of an occurrence of an engagement event during a second temporal interval, the trained artificial intelligence process comprising a trained, gradient-boosted, decision-tree process, the second temporal interval being subsequent to the first temporal interval and being separated from the first temporal interval by a corresponding buffer interval, and the engagement event being associated with a cessation of the activity during the second temporal interval; and
    transmit at least a portion of the generated output data to the computing system via a communications interface, the computing system being configured to perform operations based on the portion of the output data.

2. The apparatus of claim 1, wherein the at least one processor is further configured to:
    receive at least a portion of the first interaction data from the computing system via the communications interface; and
    store the received portion of the first interaction data within the memory.

3. The apparatus of claim 1, wherein the at least one processor is further configured to:
    obtain (i) one or more parameters that characterize the trained artificial intelligence process and (ii) data that characterizes a composition of the input dataset;
    generate the input dataset in accordance with the data that characterizes the composition; and
    apply the trained artificial intelligence process to the input dataset in accordance with the one or more parameters.

4. The apparatus of claim 3, wherein the at least one processor is further configured to:
    based on the data that characterizes the composition, perform operations that at least one of extract a first feature value from the first interaction data or compute a second feature value based on the first feature value; and
    generate the input dataset based on at least one of the extracted first feature value or the computed second feature value.

5. The apparatus of claim 1, wherein the at least one processor is further configured to:
    apply at least one of a graph-theory process or a clustering process to at least a portion of the first interaction data; and
    generate linking data based on the application of the graph-theory process or the clustering process to the portion of the first interaction data; and
    generate the input dataset based on the first interaction data and on additional interaction data associated with the linking data.

6. The apparatus of claim 1, wherein the at least one processor is further configured to execute instructions to:
    perform operations that filter the first interaction data in accordance with one or more filtration criteria; and
    generate the input dataset based on at least a portion of the filtered first interaction data.

7. The apparatus of claim 1, wherein the computing system is further configured to perform one or more treatment processes in accordance with the portion of the output data, the one or more treatment processes reducing the predicted likelihood of the occurrence of the engagement event during the second temporal interval.

8. The apparatus of claim 1, wherein the at least one processor is further configured to execute the instructions to:
    obtain elements of second interaction data, each of the elements of the second interaction data comprising a temporal identifier associated with a temporal interval;

based on the temporal identifiers, determine that a first subset of the elements of the second interaction data are associated with a prior training interval, and that a second subset of the elements of the second interaction data are associated with a prior validation interval;

generate a plurality of training datasets based on corresponding portions of the first subset; and perform operations that train the artificial intelligence process based on the training datasets.

9. The apparatus of claim 8, wherein the at least one processor is further configured to execute the instructions to:

generate a plurality of validation datasets based on portions of the second subset;

apply the trained artificial intelligence process to the plurality of validation datasets, and generate additional elements of output data based on the application of the trained artificial intelligence process to the plurality of validation datasets;

compute one or more validation metrics based on the additional elements of output data; and based on a determined consistency between the one or more validation metrics and a threshold condition, validate the trained artificial intelligence process.

10. The apparatus of claim 1, wherein:

the input dataset comprises feature values associated with a plurality of input features; and the at least one processor is further configured to execute the instructions to:

generate explainability data associated with the trained artificial intelligence process, the explainability data comprising a feature contribution value characterizing a contribution of each of the feature values to the predicted likelihood of the occurrence of the engagement event during the second temporal interval; and transmit at least the portion of the output data and the explainability data to the computing system via the communications interface, the computing system being configured to perform operations based on the portion of the output data and the explainability data.

11. The apparatus of claim 1, wherein:

the activity comprises an interaction between the device and at least one digital portal associated with the computing system; and the engagement event comprises a cessation of the interaction between the device and the at least one digital portal during the second temporal interval.

12. A computer-implemented method, comprising:

receiving an identifier of a device from a computing system using at least one processor, and based on the received identifier, obtaining, using the at least one processor, and from a data repository, elements of first interaction data associated with an activity involving the device during a first temporal interval;

generating, using the at least one processor, an input dataset based on the elements of first interaction data associated with the activity;

based on the application of a trained artificial intelligence process to the input dataset, generating, using the at least one processor, output data comprising a numerical score indicative of a predicted likelihood of an occurrence of an engagement event during a second temporal interval, the trained artificial intelligence process comprising a trained, gradient-boosted, decision-tree process, the second temporal interval being subsequent to the first temporal interval and being separated from the first temporal interval by a corresponding buffer interval, and the engagement event being associated with a cessation of the activity during the second temporal interval; and using the at least one processor, transmitting at least a portion of the generated output data to a computing system, the computing system being configured to perform operations based on the portion of the output data.

13. The computer-implemented method of claim 12, wherein:

the computer-implemented method further comprises:

obtaining, using the at least one processor, (i) one or more parameters that characterize the trained artificial intelligence process and (ii) data that characterizes a composition of the input dataset; and based on the data that characterizes the composition, performing operations, using the at least one processor, that at least one of extract a first feature value from the first interaction data or compute a second feature value based on the first feature value;

generating the input dataset comprises generating the input dataset based on at least one of the extracted first feature value or the computed second feature value; and the computer-implemented method further comprises applying, using the at least one processor, the trained artificial intelligence process to the input dataset in accordance with the one or more parameters.

14. The computer-implemented method of claim 12, wherein:

the computer-implemented method further comprises:

using the at least one processor, applying at least one of a graph-theory process or a clustering process to at least a portion of the first interaction data; and generating, using the at least one processor, linking data based on the application of the graph-theory process or the clustering process to the portion of the first interaction data; and generating the input dataset comprises generating the input dataset based on the first interaction data and on elements of additional interaction data associated with the linking data.

15. The computer-implemented method of claim 12, wherein the computing system is further configured to perform one or more treatment processes in accordance with the portion of the output data, the one or more treatment processes reducing the predicted likelihood of the occurrence of the engagement event during the second temporal interval.

16. The computer-implemented method of claim 12, further comprising:

obtaining, using the at least one processor, elements of second interaction data, each of the elements of the second interaction data comprising a temporal identifier associated with a temporal interval;

based on the temporal identifiers, determining, using the at least one processor, that a first subset of the elements of the second interaction data are associated with a prior training interval, and that a second subset of the elements of the second interaction data are associated with a prior validation interval;

generating, using the at least one processor, a plurality of training datasets based on corresponding portions of the first subset; and performing operations, using the at least one processor, that train the artificial intelligence process based on the training datasets.

17. The computer-implemented method of claim 16, further comprising:

generating, using the at least one processor, a plurality of validation datasets based on portions of the second subset;

using the at least one processor, applying the trained artificial intelligence process to the plurality of validation datasets, and generating additional elements of output data based on the application of the trained artificial intelligence process to the plurality of validation datasets;

computing, using the at least one processor, one or more validation metrics based on the additional elements of output data; and based on a determined consistency between the one or more validation metrics and a threshold condition, validating the trained artificial intelligence process using the at least one processor.

18. The computer-implemented method of claim 12, wherein:

the input dataset comprises feature values associated with a plurality of input features;

the computer-implemented method further comprises generating, using the at least one processor, explainability data associated with the trained artificial intelligence process, the explainability data comprising a feature contribution value characterizing a contribution of each of the input feature values to the predicted likelihood of the occurrences of the engagement event during the second temporal interval; and the transmitting comprises transmitting at least the portion of the output data and the explainability data to the computing system, the computing system being configured to perform operations based on the portion of the output data and the explainability data.

19. A tangible, non-transitory computer-readable medium storing instructions that, when executed by at least one processor, cause the at least one processor to perform a method, comprising:

receiving an identifier of a device from a computing system, and based on the received identifier, obtaining, from a data repository, elements of first interaction data associated with an activity involving the device during a first temporal interval;

generating an input dataset based on the elements of interaction data associated with the activity;

based on the application of a trained artificial intelligence process to the input dataset, generating output data comprising a numerical score indicative of a predicted likelihood of an occurrence of an engagement event during a second temporal interval, the trained artificial intelligence process comprising a trained, gradient-boosted, decision-tree process, the second temporal interval being subsequent to the first temporal interval and being separated from the first temporal interval by a corresponding buffer interval, and the engagement event being associated with a cessation of the activity during the second temporal interval; and transmitting at least a portion of the generated output data to a computing system, the computing system being configured to perform operations based on the portion of the output data.

\* \* \* \* \*